(12) United States Patent
Yang

(10) Patent No.: US 11,372,528 B2
(45) Date of Patent: Jun. 28, 2022

(54) USER INTERFACE DISPLAY METHOD, DEVICE, AND APPARATUS

(71) Applicant: GUANGDONG OPPO MOBILE TELECOMMUNICATIONS CORP., LTD., Guangdong (CN)

(72) Inventor: Song Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/929,808

(22) Filed: Jul. 15, 2020

(65) Prior Publication Data

US 2020/0363937 A1    Nov. 19, 2020

Related U.S. Application Data

(63) Continuation of application No. PCT/CN2019/071021, filed on Jan. 9, 2019.

(30) Foreign Application Priority Data

Jan. 19, 2018   (CN) .......................... 201810055548.4

(51) Int. Cl.
*G06F 3/04883* (2022.01)
*G06F 3/04845* (2022.01)

(52) U.S. Cl.
CPC ...... *G06F 3/04845* (2013.01); *G06F 3/04883* (2013.01); *G06F 2203/04803* (2013.01)

(58) Field of Classification Search
CPC ............. G06F 3/04845; G06F 3/04883; G06F 2203/04803
See application file for complete search history.

(56) References Cited

U.S. PATENT DOCUMENTS

2014/0189591 A1 * 7/2014 Park ................... H04M 1/7243
                                                       715/830
2015/0227298 A1   8/2015 Kim et al.
(Continued)

FOREIGN PATENT DOCUMENTS

CN       101661383       3/2010
CN       103279303       9/2013
(Continued)

OTHER PUBLICATIONS

KIPO, Office Action for KR Application No. 10-2020-7022048, dated Aug. 9, 2021.
(Continued)

*Primary Examiner* — Andrea C Leggett
(74) *Attorney, Agent, or Firm* — Hodgson Russ LLP

(57) ABSTRACT

A user interface display method, a device, and an apparatus, pertaining to the field of human machine interaction. The method comprises: receiving a sliding signal; displaying an activated user interface according to a slide of the sliding signal on a screen, the activated user interface comprising a first display region and a second display region; if a sliding direction of the sliding signal is a first direction, replacing first sub-content in the first region with third sub-content of a second display region; if the sliding direction of the sliding signal is a second direction, replacing fourth sub-content in the second display region with second sub-content of the first display region.

20 Claims, 18 Drawing Sheets

(56) References Cited

U.S. PATENT DOCUMENTS

| | | | |
|---|---|---|---|
| 2015/0227308 | A1 | 8/2015 | Kim et al. |
| 2016/0041702 | A1 | 2/2016 | Wang |
| 2016/0132188 | A1 | 5/2016 | Li et al. |
| 2016/0378334 | A1 | 12/2016 | Liu et al. |
| 2017/0031555 | A1 | 2/2017 | Ma |
| 2017/0344253 | A1 | 11/2017 | Zhang |
| 2018/0356972 | A1* | 12/2018 | Wang .................. G06F 3/044 |
| 2020/0371685 | A1* | 11/2020 | Wang .................. G06F 3/04845 |

FOREIGN PATENT DOCUMENTS

| | | |
|---|---|---|
| CN | 103294402 | 9/2013 |
| CN | 103488403 | 1/2014 |
| CN | 104298463 | 1/2015 |
| CN | 104375741 | 2/2015 |
| CN | 104407827 | 3/2015 |
| CN | 104571873 | 4/2015 |
| CN | 104636024 | 5/2015 |
| CN | 104969163 | 10/2015 |
| CN | 105468286 | 4/2016 |
| CN | 107168609 | 9/2017 |
| CN | 108255405 | 7/2018 |
| JP | 2015176108 | 10/2015 |
| JP | 2016126725 | 7/2016 |
| JP | 2016532946 | 10/2016 |
| KR | 20150041221 | 4/2015 |
| KR | 20150095540 | 8/2015 |
| KR | 20170029329 | 3/2017 |

OTHER PUBLICATIONS

IPA, Office Action for AU Application No. 2019210404, dated Jul. 14, 2021.
IPI, Office Action for IN Application No. 202017035110, dated Aug. 27, 2021.
JPO, Office Action for JP Application No. 2020-539736, dated Jun. 8, 2021.
IPAU, Examination Report No. 1 for AU Application No. 2019210404, dated Mar. 5, 2021.
EPO, Extended European Search Report for EP Application No. 19740918.8, dated Feb. 16, 2021.
SIPO, First Office Action for CN Application No. 201810055548.4, dated May 5, 2019.
SIPO, Notification to Grant Patent Right for Invention for CN Application No. 201810055548.4, dated Aug. 7, 2019.
WIPO, ISR for PCT/CN2019/071021, Apr. 3, 2019.
JPO, Office Action for JP Application No. 2020-539736, dated Jan. 7, 2022.
IPA, Office Action for AU Application No. 2019210404, dated Nov. 3, 2021.
IPA, Office Action for AU Application No. 2019210404, dated Feb. 18, 2022.
KIPO, Notice of Allowance for KR Application No. 10-2020-7022048, dated Apr. 14, 2022.
KIPO, Rejection Decision for KR Application No. 10-2020-7022048, dated Feb. 18, 2022.

\* cited by examiner

USER INTERFACE DISPLAY METHOD, DEVICE, AND APPARATUS

CROSS REFERENCE TO RELATED APPLICATIONS

The present application is a continuation of International Application No. PCT/CN2019/071021, filed Jan. 9, 2019, which claims priority to Chinese Patent Application No. 201810055548.4, filed Jan. 19, 2018, the entire disclosures of which are incorporated herein by reference.

TECHNICAL FIELD

The present application relates to the field of human machine interaction, and in particular, to a user interface display method, a device, and an apparatus.

BACKGROUND

Mobile terminals such as smart phones and tablet computers are the most frequently used electronic devices by users.

In related technologies, when a user pulls down from a status bar at the top of the desktop, the operating system displays a pull-down user interface following the user's pull-down operation. Several control items and several notification messages are displayed on the pull-down user interface. Control items include: a wireless network switch, a Bluetooth switch, a mute switch, a flight mode switch, a brightness adjustment slider bar, etc.

SUMMARY

The present application provides a user interface display method, a device, and a terminal. The technical solution is as follows:

According to an aspect of the present application, a user interface display method is provided, and the method includes:

receiving a sliding signal; displaying an activated user interface on a screen according to the sliding signal; the activated user interface includes a first display region and a second display region, the first display region displaying first sub-content of first display content and the second display region displaying fourth sub-content of second display content; if a sliding direction of the sliding signal is a first direction, replacing the first sub-content in the first region with third sub-content in the second display region, the second display content including the third sub-content and the fourth sub-content; if the sliding direction of the sliding signal is a second direction, replacing the fourth sub-content in the second display region with second sub-content in the first display region, the first display content including the first sub-content and the second sub-content.

According to another aspect of the present application, a user interface display device is provided, and the device includes:

a receiving module, configured to receive a sliding signal; displaying an activated user interface on a screen according to the sliding signal, wherein the activated user interface includes a first display region and a second display region, the first display region displays first sub-content of the first display content and the second display region displays fourth sub-content of the second display content; if a sliding direction of the sliding signal is a first direction, replacing the first sub-content in the first region with third sub-content in the second display region, the second display content including the third sub-content and the fourth sub-content; if the sliding direction of the sliding signal is a second direction, replacing the fourth sub-content in the second display region with second sub-content in the first display region, the first display content including the first sub-content and the second sub-content.

According to another aspect of the present application, a terminal is provided. The terminal includes a processor and a memory, and the memory stores at least one program, and the at least one program is loaded and executed by the processor to implement the user interface display method as described above.

According to another aspect of the present application, a computer-readable storage medium is provided. The storage medium stores at least one program, and the at least one program is loaded and executed by the processor to implement the user interface display method as described above.

DETAILED DESCRIPTION

To make the objectives, technical solutions, and advantages of the present application clearer, the embodiments of the present application will be described in further detail below with reference to the accompanying drawings.

In the related art, due to limited display region of a pull-down user interface, fewer control items and notification messages can be displayed.

A user interface display method provided in this embodiment can be applied to a terminal. The terminal can be a mobile phone, a tablet, an e-book reader, an MP3 (Moving Picture Experts Group Audio Layer III) player, an MP4 (Moving Picture Experts Group Audio Layer IV) Player, a laptop and a desktop computer, etc. Optionally, a touch screen is provided on the terminal.

Figure 1:
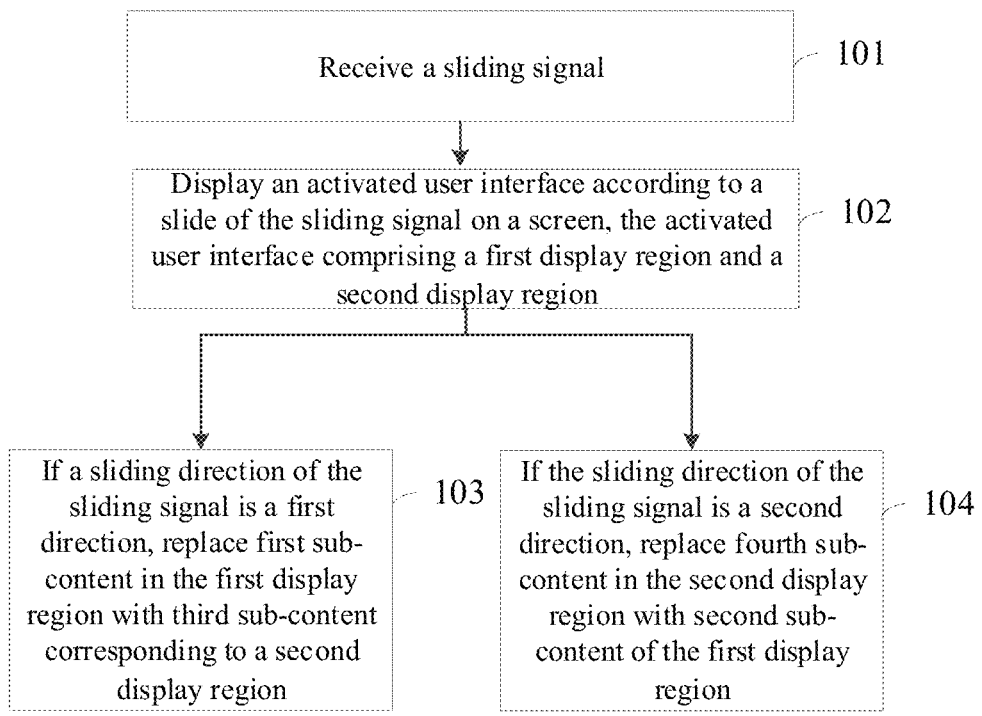
FIG. 1 shows a flowchart of a user interface display method provided by an exemplary embodiment of the present application.

FIG. 1 shows a flowchart of a user interface display method provided by an exemplary embodiment of the present application. This embodiment is exemplified by applying the method to a terminal. The method includes:

Step 101, receiving a sliding signal;

wherein, a screen of a terminal may be a touch screen, and the terminal receives the sliding signal through the touch screen;

Step 102, displaying an activated user interface according to a slide of the sliding signal on a screen, the activated user interface including a first display region and a second display region;

optionally, the terminal follows a sliding process of the sliding signal on the screen, and moves the activated user interface from a preset edge of the screen into the screen for display. The activated user interface may be implemented by a pull-down interface control or a drawer control.

The first display region and the second display region respectively correspond to different types of display content.

Optionally, the first display region corresponds to first display content, the first display content includes first sub-content and second sub-content, and the first display region displays the first sub-content of the first display content in an initial state.

Optionally, the second display region corresponds to second display content, the second display content includes third sub-content and fourth sub-content, and the second display region displays the fourth sub-content of the second display content in an initial state.

Figure 2:
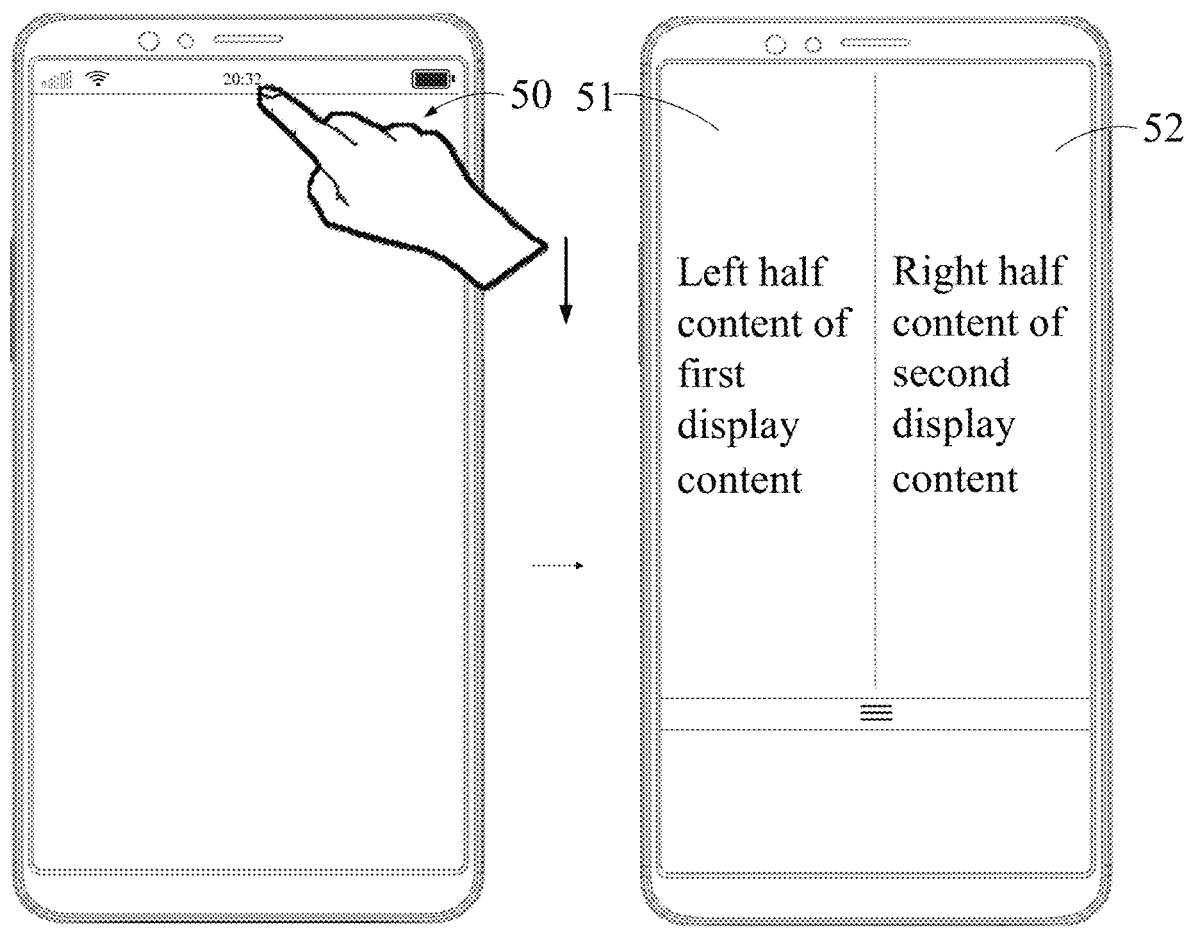
FIG. 2 is a schematic interface diagram of the user interface display method provided in the embodiment of FIG. 1 in a schematic implementation.

Referring to FIG. 2 schematically, after receiving the sliding signal, the terminal moves an activated user interface 50 from top of a screen into the screen for display. The activated user interface 50 may also be referred to as a pull-down user interface. The activated user interface 50 includes a first display region 51 on left and a second display region 52 on right. The first display region 51 displays left half content of the first display content, and the second display region 52 displays right half content of the second display content.

Step 103, if a sliding direction of the sliding signal is a first direction, replacing the first sub-content in the first region with the third sub-content in the second display region;

taking the first direction as a right direction as an example, if the sliding direction of the sliding signal is the right direction, the terminal replaces the first sub-content in the first display region with the third sub-content of the second display content, so that the first display region and the second display region respectively display part of the second display content, so as to display the second display content on the activated user interface.

Figure 3:
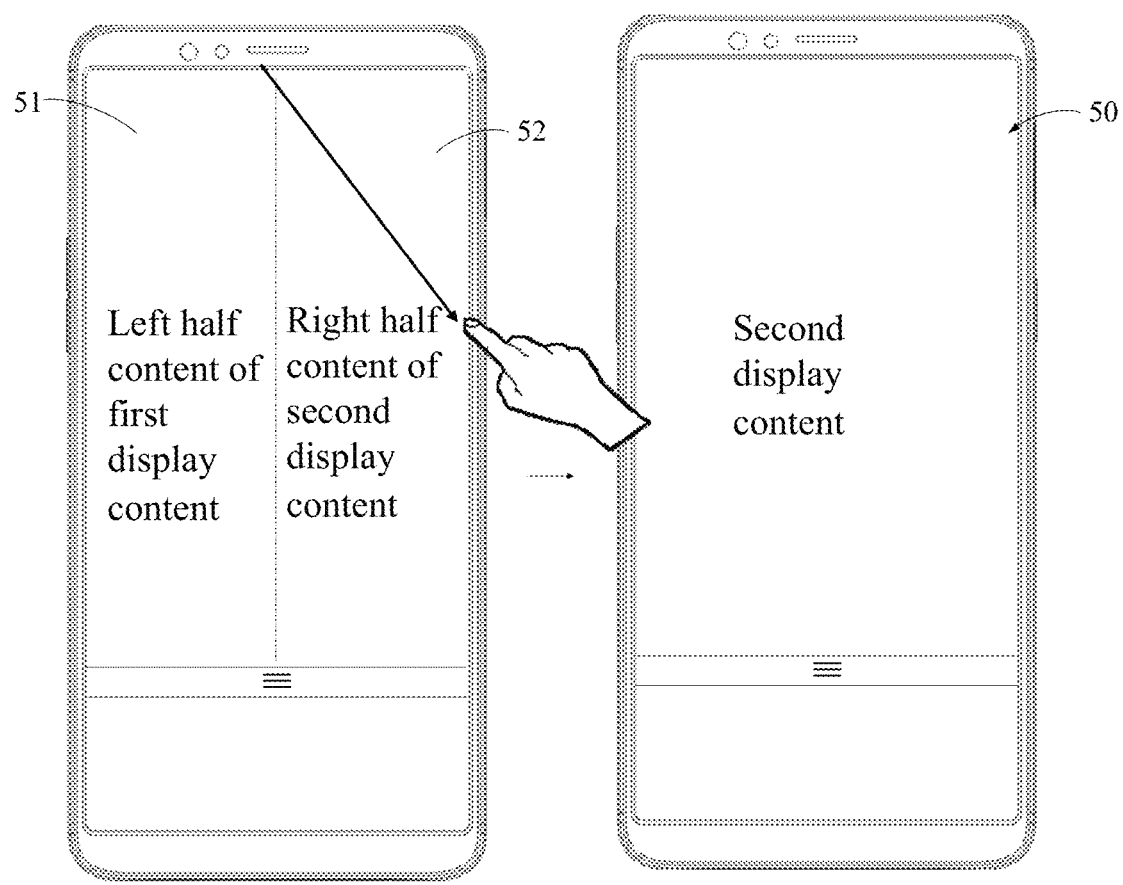
FIG. 3 is a schematic interface diagram of the user interface display method provided in the embodiment of FIG. 1 in a schematic implementation.

Referring to FIG. 3 schematically, if the sliding direction of the sliding signal is the right direction, the terminal replaces the left half content of the first display content displayed in the first display region 51 with left half content of a second user interface, so that display content of the entire activated user interface 50 is display content of the second user interface.

Step 104, if the sliding direction of the sliding signal is a second direction, replacing the fourth sub-content in the second display region with the second sub-content in the first display region;

taking the second direction as a left direction as an example, if the sliding direction of the sliding signal is the left direction, the terminal replaces the fourth sub-content in the second display region with the second sub-content corresponding to the first display content, so that the first display region and the second display region respectively display part of content of a first user interface, so as to display the first display content on the activated user interface.

Figure 4:
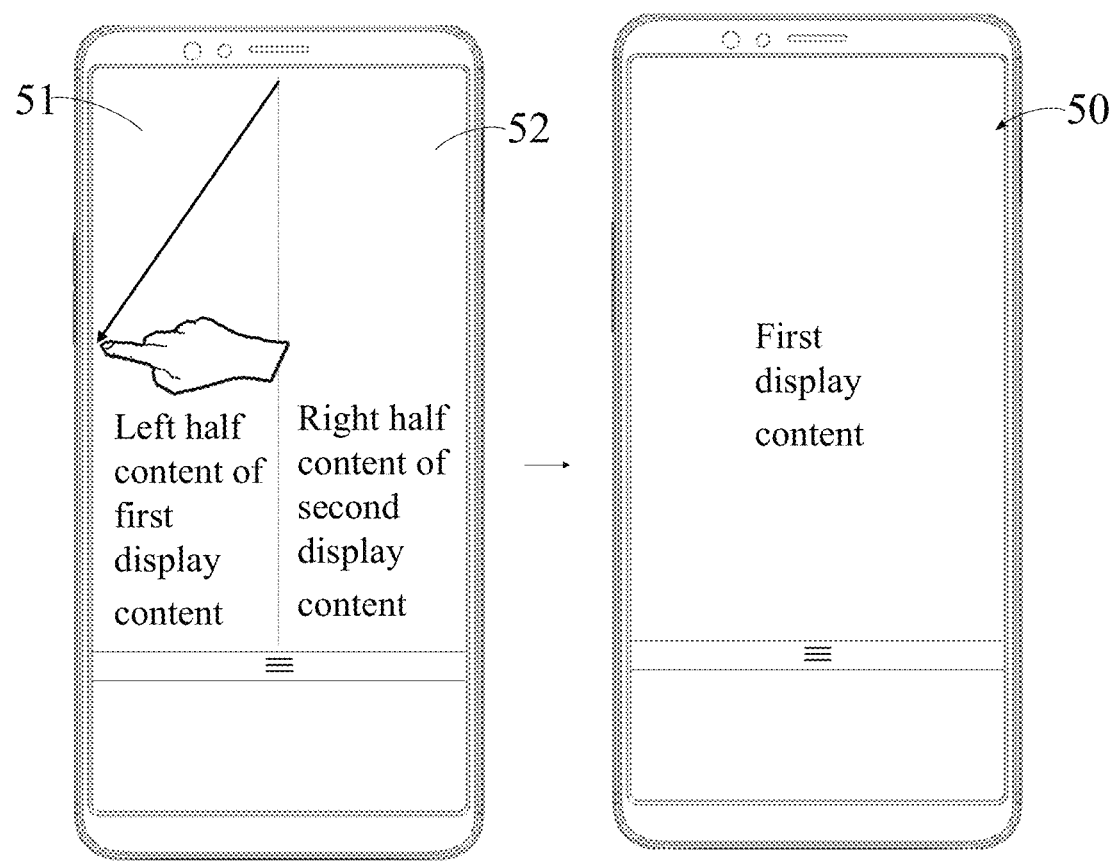
FIG. 4 is a schematic interface diagram of the user interface display method provided in the embodiment of FIG. 1 in a schematic implementation.

With reference to FIG. 4, if the sliding direction of the sliding signal is the left direction, the terminal replaces the right half content of the second display content displayed in the second display region 52 with the right half content of the first display content, so that the display content of the entire activated user interface 50 is the first display content.

In summary, the method provided by this embodiment provides a preview of two different types of display content in two display regions by providing a first display region and a second display region side by side on an activated user interface. A sliding direction of a sliding signal dynamically changes display content of one of the two display regions, so that both the first display region and the second display region display certain display content, which solves the problems of limitation of display region of a pull-down user interface, and fewer control items and notification messages in related technologies, thereby achieving the effects, of which according to the sliding direction of the sliding signal, after a user previews first display content and second display content, all of the first display content or the second display content can be displayed on the entire activated user interface, and more display content desired by the user can be displayed in a limited display region.

It should be noted that, in the foregoing embodiment, the sliding signal may be a linear sliding signal, a curved sliding signal of an approximately straight line, or a two-section sliding signal having an inflection point. This application does not limit the specific form of the sliding signal. Illustratively, the sliding signal may be a sliding signal in which the sliding signal is changed from down to left, or the sliding signal may be a sliding signal in which the sliding signal is changed from down to right.

Figure 5:
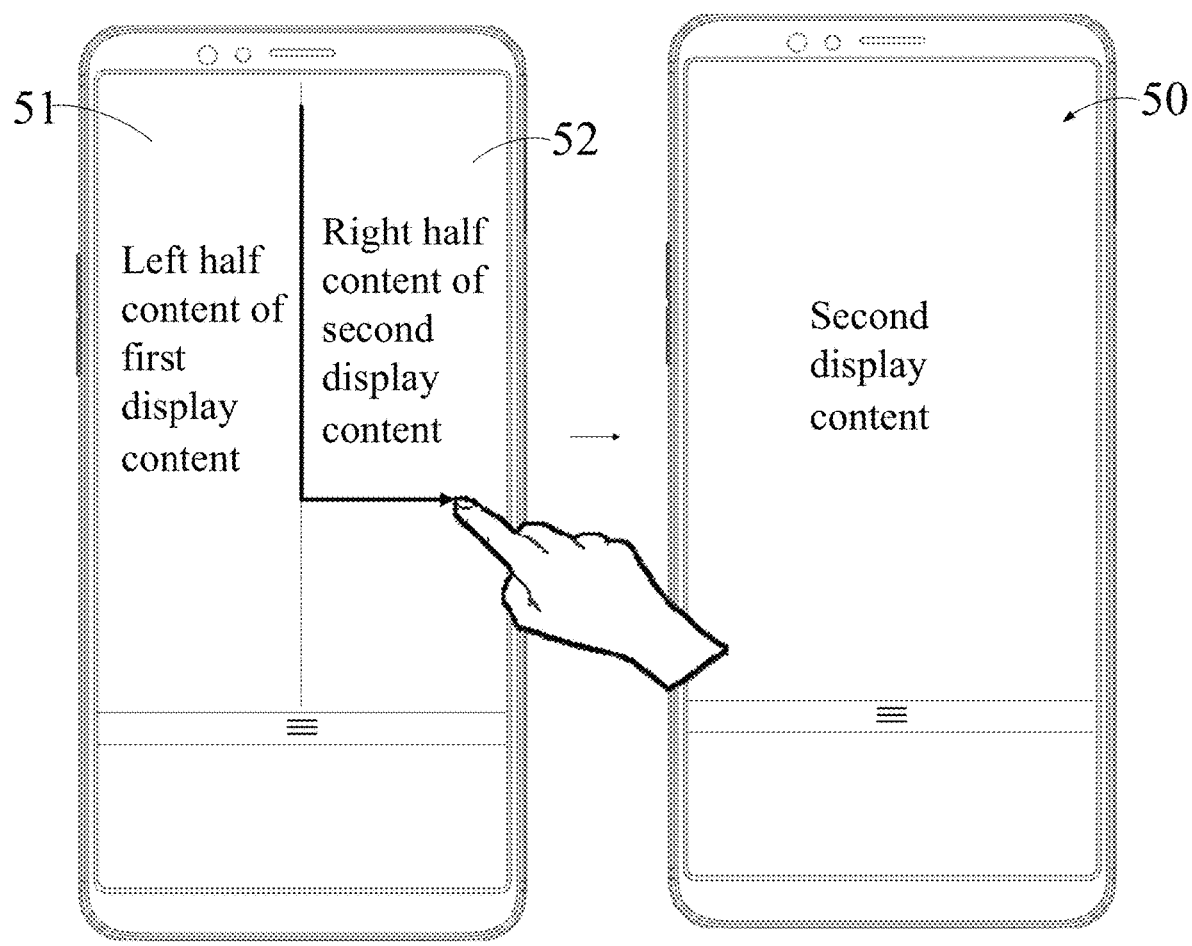
FIG. 5 is a schematic interface diagram of the user interface display method provided in the embodiment of FIG. 1 in a schematic implementation.

Referring to FIG. 5, if the sliding direction of the sliding signal changes from a down direction to a right direction, the terminal replaces the left half content of the first display content displayed in the first display region 51 with the left half content of the second user interface, so that the display content of the entire activated user interface 50 is the display content of the second user interface.

Figure 6:
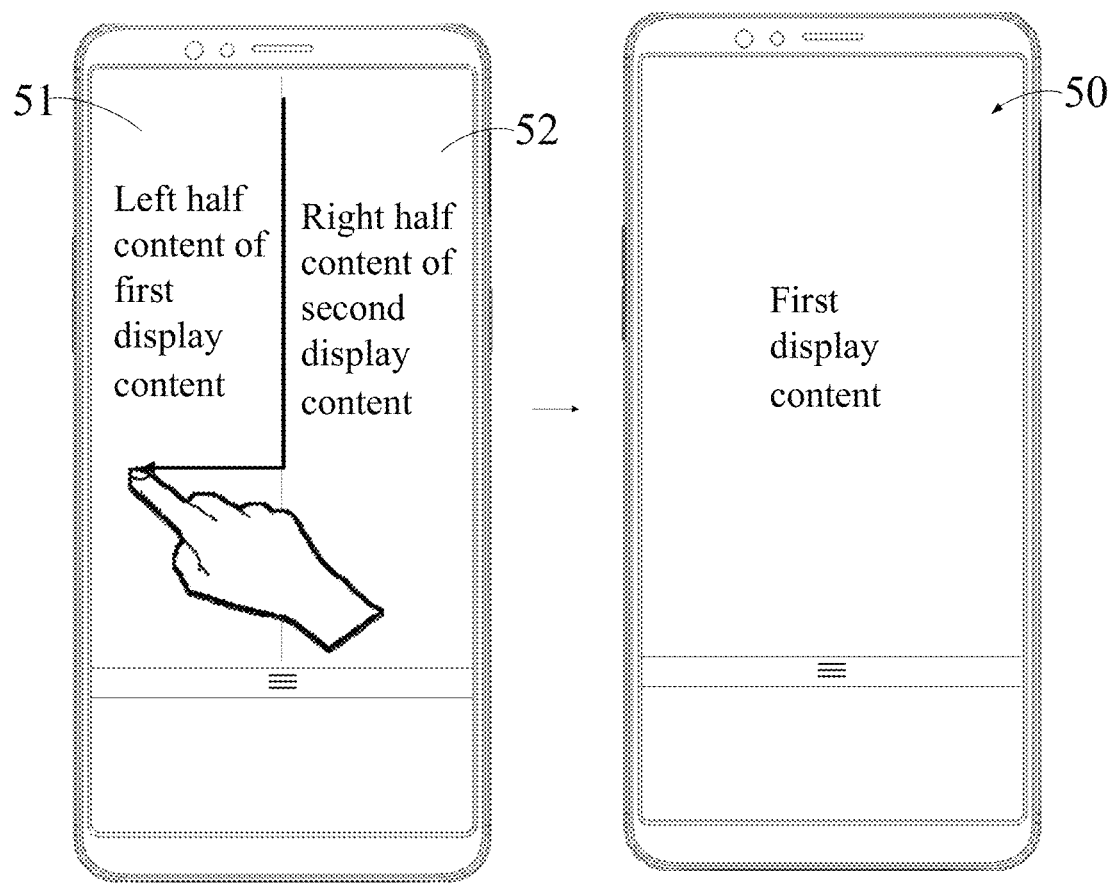
FIG. 6 is a schematic interface diagram of the user interface display method provided in the embodiment of FIG. 1 in a schematic implementation.

Referring to FIG. 6, if the sliding direction of the sliding signal changes from a down direction to a left direction, the terminal replaces the right half content of the second display content displayed in the second display region 52 with the right half content of the first display content, so that the display content of the entire activated user interface 50 is the first display content.

The first user interface in the above embodiment may be a control center interface, which is a user interface used to display at least one control item; the second user interface may be a notification center interface used to display at least one control item. User interface for a notification message. Alternatively, the first user interface is a notification center interface, and the second user interface is a control center interface. In the following, take an example of the first user interface is a control center interface, the second user interface is a notification center interface, and the sliding signal is a two-segment sliding signal with an inflection point.

Figure 7:
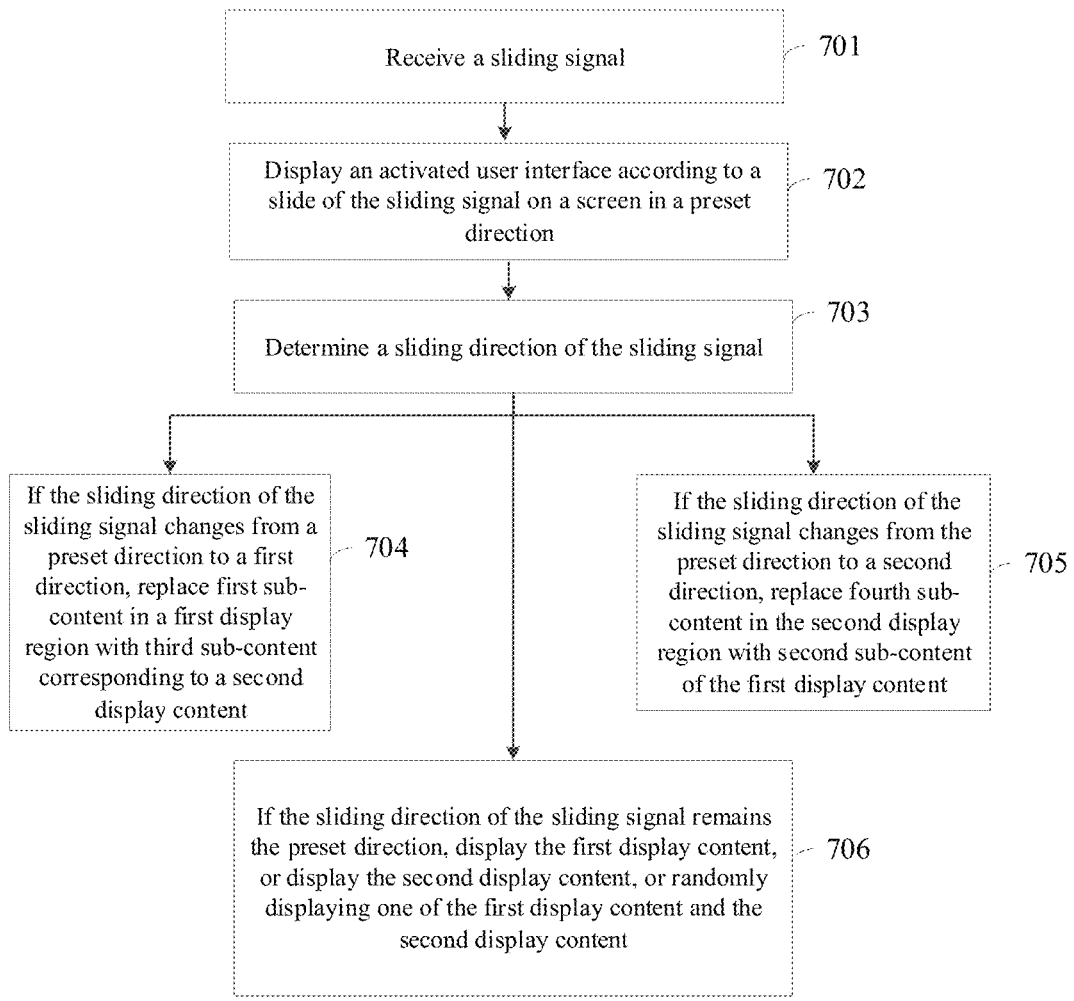
FIG. 7 shows a flowchart of a user interface display method provided by an exemplary embodiment of the present application.

FIG. 7 shows a flowchart of a user interface display method provided by an exemplary embodiment of the present application. The method includes:

Step 701, receiving a sliding signal;

illustratively, a screen of a terminal is a rectangular screen, a rounded rectangular screen, a square screen, or a special-shaped screen. Viewed from a front view, the screen of the terminal has four edges: upper, lower, left, and right.

In the standby state, icons of several application programs and status bars are displayed on the screen of the terminal. The icons of several application programs may include icons of application programs provided by an operating system, and icons of application programs provided by third-party developers.

The terminal receives the sliding signal through the touch screen. Exemplarily, a typical sliding signal includes: a finger down event (ACTION_DOWN), at least one finger move event (ACTION_MOVE), and a finger up event (ACTION_UP). Usually, a sliding signal starts with ACTION_DOWN. Each action can have corresponding touch coordinates on the touch screen.

Step 702, displaying an activated user interface according to a slide of the sliding signal on a screen in a preset direction;

an initial sliding direction of the sliding signal is a preset direction. In this embodiment, it is illustrated that the preset direction is a down direction.

Optionally, the terminal follows a sliding process of the sliding signal on the screen, and moves the activated user interface from a preset edge of the screen into the screen for display. The activated user interface may be implemented by a pull-down interface control or a drawer control.

Optionally, if the sliding signal meets a preset condition, the terminal displays the activated user interface on the screen according to the slide of the sliding signal in the preset direction. The preset condition includes: a sliding starting point of the sliding signal is located at the preset edge of the screen; or, the sliding starting point of the sliding signal is located at the preset edge of the screen, and a sliding distance of the sliding signal exceeds a first threshold; or, the sliding starting point of the sliding signal is located in a predetermined region in middle of the preset edge; or, the sliding starting point of the sliding signal is located in the predetermined region in the middle of the preset edge, and the sliding distance of the sliding signal exceeds the first threshold. In this embodiment, the preset edge may be an upper edge of the screen.

The activated user interface is also called a pull-down user interface. The activated user interface includes a first display region and a second display region. The first display region is all or most of region on left side of the activated user interface, and the second display region is all or most of region on right side of the activated user interface.

The first display region displays first sub-content of first display content, and the second display region displays fourth sub-content of second display content.

Figure 8:
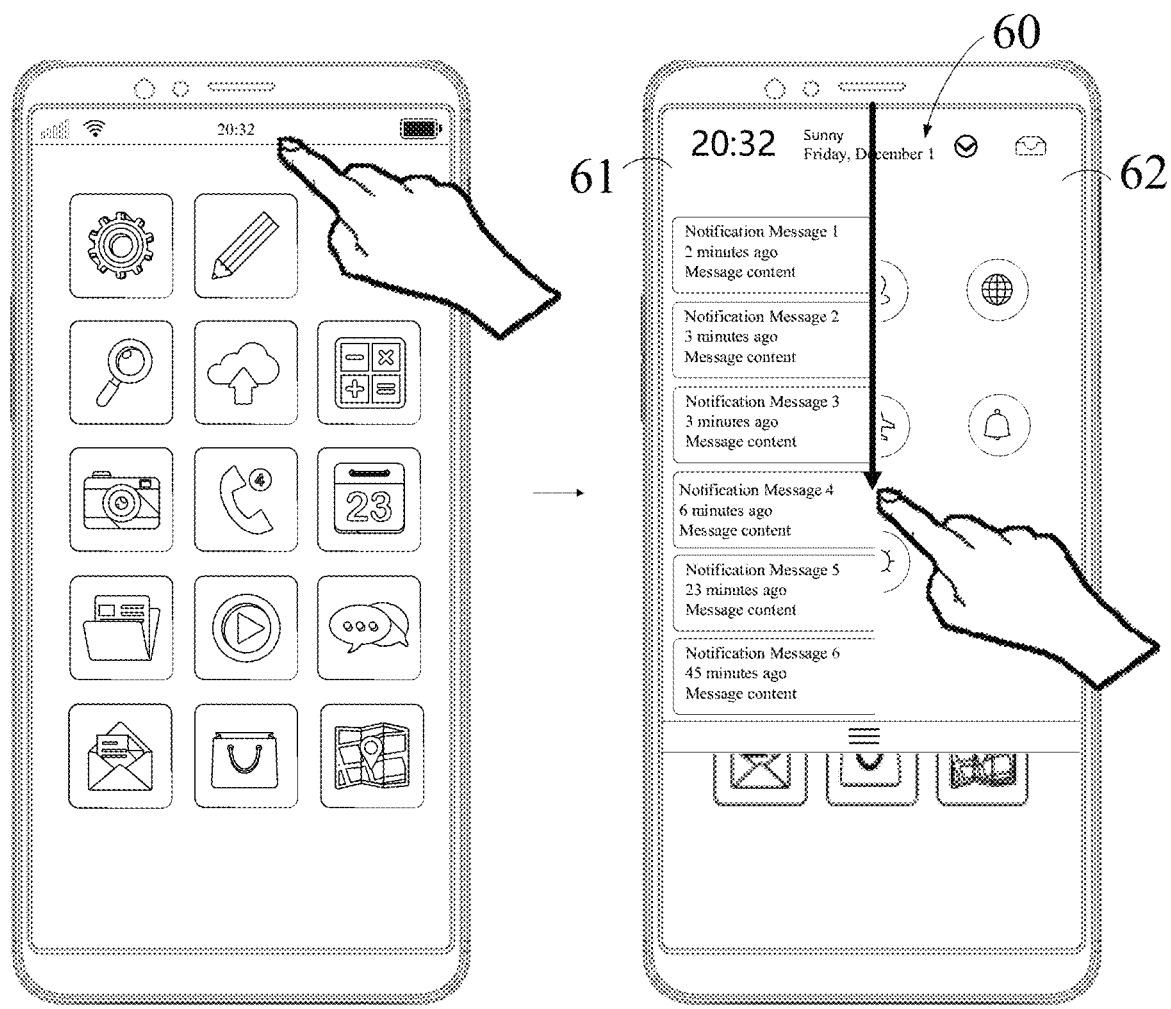
FIG. 8 is a schematic interface diagram of the user interface display method provided in the embodiment of FIG. 7 in a schematic implementation.

As shown in FIG. 8, an activated user interface 60 includes a first display region 61 and a second display region 62. The first display region 61 displays left half contend of a control center interface, and the second display region 62 displays right half content of a notification center interface.

Optionally, the activated user interface 60 is displayed from top of the screen and moved into the screen. A speed at which the activated user interface 60 moves down into the screen is positively related to a sliding speed of the sliding signal. The activated user interface 60 may occupy the entire display region of the screen, or may occupy part of the display region of the screen.

Lengths of the first display region 61 and the second display region 62 are same, and widths of the first display region 61 and the second display region 62 are same or different.

Optionally, the first display region 61 displays the left half content of the control center interface. The control center interface is a user interface for displaying at least one control item. The control item includes, but are not limited to, at least one of a flight mode control switch, a cellular network control switch, a WiFi (Wireless Fidelity) network control switch, a VPN (Virtual Private Network), a WiFi hotspot switch, a Bluetooth switch, an anti-disturbance switch, a location service switch, a flashlight switch, an automatic screen rotation switch, a screen recording function switch, a power saving mode switch, a screenshot switch, a vibration switch, a mute switch, and a screen always on switch. It is divided according to a dividing line located at the center (or other non-central location). The control center interface includes left half content and right half content. In an initial state, the first display region 61 displays the left half content of the control center interface.

Optionally, the second display region 62 displays the right half content of the notification center interface. The notification center interface is a user interface for displaying notification messages. The notification message displayed on the notification center interface can be zero or more, depending on a number of unread messages. The notification message includes, but is not limited to, at least one of a short message, an instant message, a voice communication message, an email message, and a recommendation message pushed by a third-party application. It is divided according to the dividing line located at the center (or other non-center). The notification center interface includes the left half content and the right half content. In the initial state, the second display region 62 displays the right half content of the notification center interface.

Optionally, part between the first display region 61 and the second display region 62 may be displayed with a dividing line, a border, or a blurred transition region, which is not limited in the embodiment of the present application.

Step 703, determining a sliding direction of the sliding signal.

The user can continue to slide on the screen, and the sliding direction of the sliding signal can be changed from a down direction to another direction, such as a left direction or a right direction, and the terminal determines the sliding direction of the sliding signal in real time.

The terminal receives an ACTION_MOVE event reported by the touch screen at predetermined time intervals, and extracts the touch coordinates from the ACTION_MOVE event. Optionally, the terminal calculates the sliding direction of the sliding signal according to the touch coordinates collected adjacent two times (or multiple times in a row). For example, the terminal points an i-th touch coordinate to a direction of an i+1th touch coordinate and determines the sliding direction of the sliding signal; for example, the terminal draws a sliding track of the sliding signal based on the touch coordinates collected multiple times in succession, and determines the sliding direction of the sliding signal according to a tangent of latest touch coordinate on the sliding track. The embodiment of the present application does not limit the specific manner in which the terminal determines the sliding direction of the sliding signal.

Figure 9:
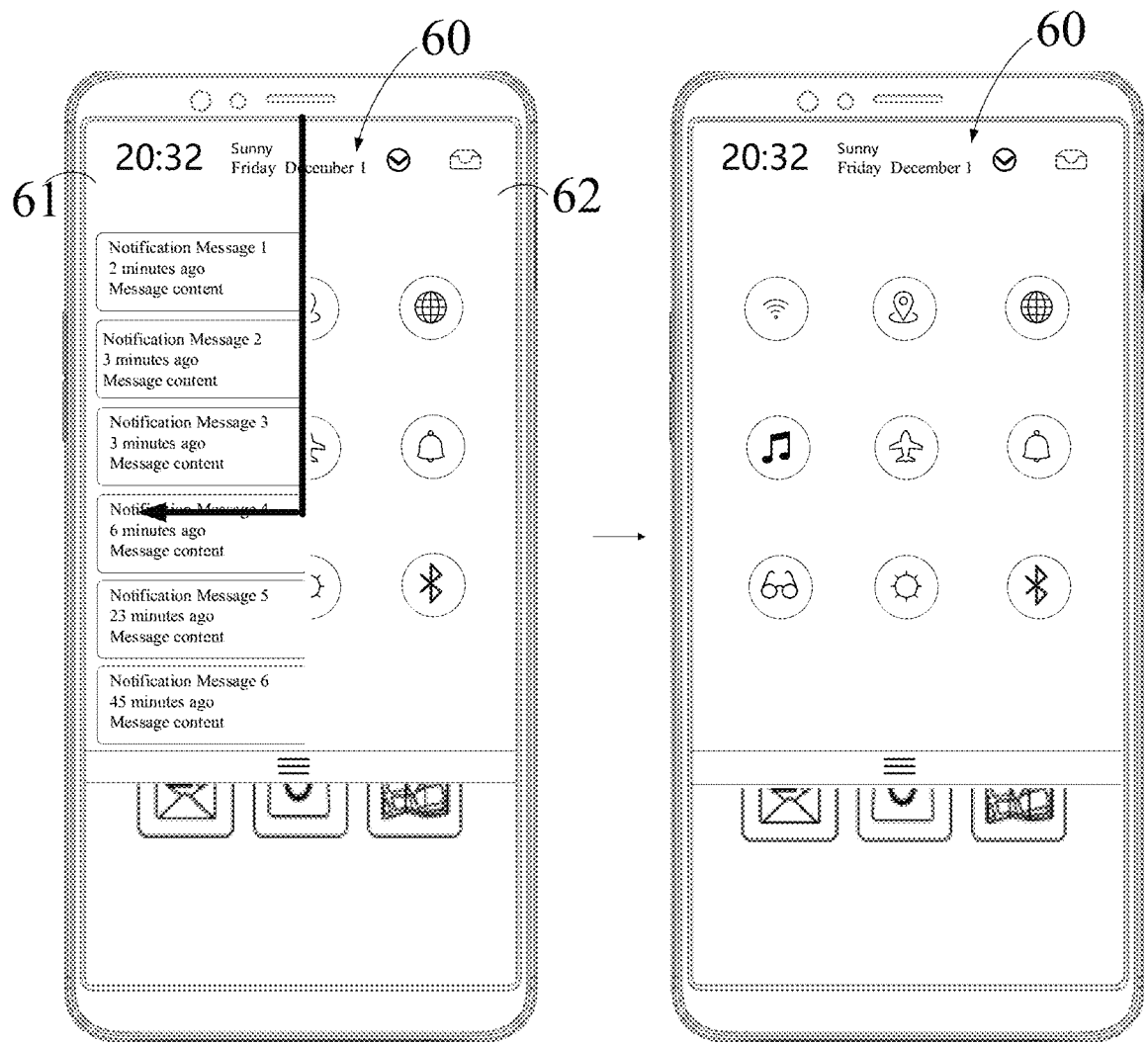
FIG. 9 is a schematic interface diagram of the user interface display method provided in the embodiment of FIG. 7 in a schematic implementation.

Step 704, if the sliding direction of the sliding signal changes from the preset direction to a first direction, replacing first sub-content in the first display region with third sub-content corresponding to the second display content;

Assume that a horizontal right direction is a 0° direction. If the sliding direction changes from the down direction to the left direction, the down direction means that the sliding direction belongs to [90°−α, 90°+α], and the right direction means that the sliding direction belongs to [180°−α, 180°+α], the terminal replaces the left half content of the notification center interface in the first display region 61 with the left half content of the control center interface, as shown in FIG. 9. The α is a preset tolerance threshold.

Optionally, the above replacement process is a direct replacement in a short time, or the above replacement process is a slow replacement accompanied by animation. The animation corresponding to the above replacement process may be: moving the dividing line between the first display region 61 and the second display region 62 to a left side at a first speed, the display content of the notification center interface located on the left side of the dividing line gradually disappearing, the display content of the control center interface located on a right side of the dividing line gradually increasing, until when the dividing line moves to a first edge side of the screen, the display content of the control center interface is displayed on the entire activated user interface 60. That is, the terminal gradually cancels display of the first sub-content in the first display region and gradually displays the third sub-content in the first display region according to the slide of the terminal in the first direction.

Step 705, if the sliding direction of the sliding signal changes from the preset direction to a second direction, replacing fourth sub-content in the second display region with second sub-content of the first display content.

Figure 10:
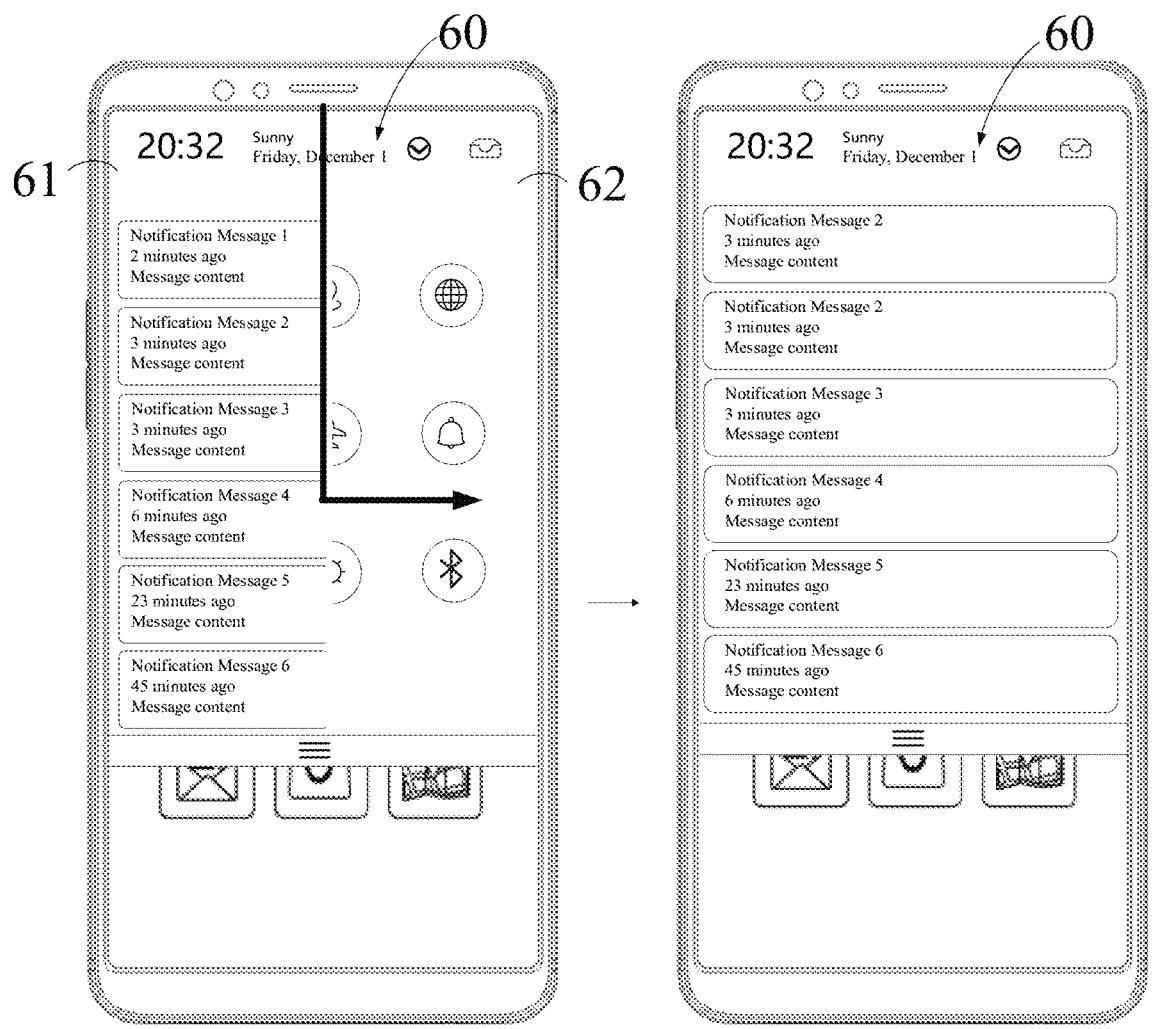
FIG. 10 is a schematic interface diagram of the user interface display method provided in the embodiment of FIG. 7 in a schematic implementation.

Assume that the horizontal right direction is the 0° direction, if the sliding direction changes from the down direction to the right direction, the down direction means that the sliding direction belongs to [90°−α, 90°+α], and the right direction means the sliding direction belongs to [0°−α, 0°+α], the terminal replaces the right half content of the control center interface in the second display region 62 with the left half content of the notification center interface, as shown in FIG. 10.

Optionally, the above replacement process is a direct replacement in a short time, or the above replacement process is a slow replacement accompanied by animation. The animation corresponding to the above replacement process may be: moving the dividing line between the first display region 61 and the second displaying region 62 to a right side at a second speed, and the display content of the control center interface on the right side of the dividing line gradually disappearing, the display content of the notification center interface located on a left side of the dividing line gradually increasing, until the dividing line moves to a second edge side of the screen, the display content of the notification center interface is displayed on the entire activated user interface 60. That is, the terminal gradually cancels display of the fourth sub-content in the second display region and gradually displays the second sub-content in the second display region according to the slide of the terminal in the second direction.

Step 706, if the sliding direction of the sliding signal remains the preset direction, displaying the first display content, or displaying the second display content, or randomly displaying one of the first display content and the second display content.

Since the user may slide down without changing the sliding direction, the terminal may display the notification center interface, or the control center interface, or randomly display one of the notification center interface and the control center interface. That is, the terminal may adopt any one of the following three methods.

First, display the notification center interface.

Figure 11:
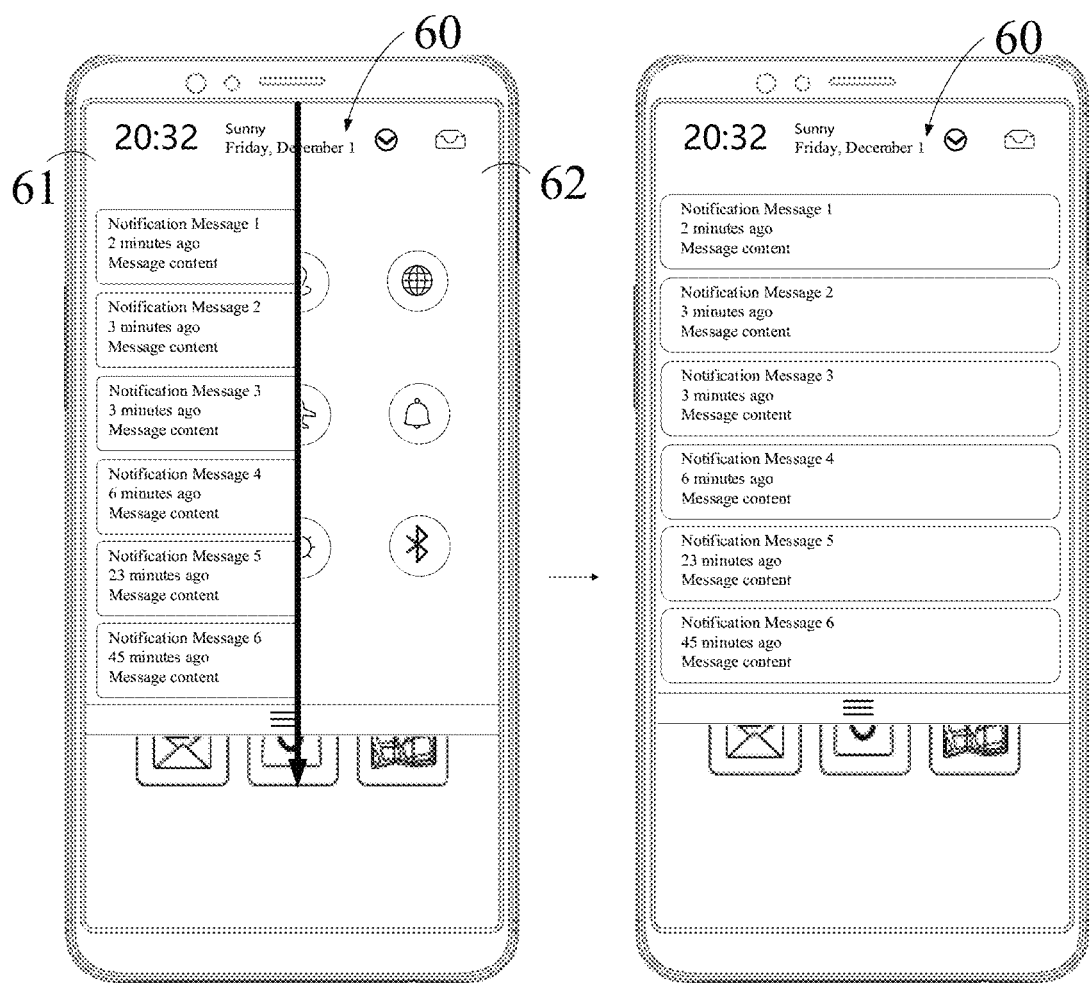
FIG. 11 is a schematic interface diagram of the user interface display method provided in the embodiment of FIG. 7 in a schematic implementation.

Assume that the horizontal right direction is the 0° direction, if the sliding direction of the sliding direction is maintained at [90°−α, 90°+α] in a clockwise direction, the terminal replaces the right half content of the control center interface in the second display region with the right half content of the notification center interface, as shown in FIG. 11.

The replacement process may refer to related description in Step 705.

Second, display the control center interface.

Assume that the horizontal right direction is the 0° direction, if the sliding direction of the sliding direction is maintained at [90°−α, 90°+α] in a clockwise direction, the terminal replaces the left half content of the notification center interface in the first display region with the left half content of the control center interface.

The replacement process may refer to related description in Step 704.

Third, randomly display one of the notification center interface and the control center interface.

Assume that the horizontal right direction is the 0° direction, if the sliding direction of the sliding direction is maintained at [90°−α, 90°+α] in a clockwise direction, the terminal generates a random number. If the random number is an odd number, the right half content of the control center interface in the second display region is replaced with the right half content of the notification center interface; if the random number is an even number, the right half content of the control center interface in the second display region is replaced with the right half content of the notification center interface.

In a possible embodiment, if the sliding direction of the sliding signal is an opposite direction of the preset direction (may be the up direction in this embodiment), the terminal cancels display of the activated user interface. That is, the terminal moves the activated user interface up and out of the screen in the preset edge of the screen, and restores the screen of the terminal to an original display state. The original display state is a display state of the terminal before displaying the activated user interface.

In summary, the method provided in this embodiment provides a preview of a notification center interface or a control center interface in two display regions by providing a first display region and a second display region side by side on an activated user interface. A sliding direction of a signal dynamically changes display content of one of the display regions, so that both the first display region and the second display region display certain display content, which solves the problems of limitation of display region of a pull-down user interface, and fewer control items and notification messages in related technologies, thereby achieving the effects, of which according to the sliding direction of the sliding signal, all of the first display content or the second display content can be displayed on the entire activated user interface, and more display content desired by the user can be displayed in a limited display region.

The method provided in this embodiment further displays a notification center interface or displays a control center interface or randomly displays one of the notification center interface and the control center interface if the sliding signal continues to slide down, so that even if a user does not change a sliding direction of the sliding signal, the terminal can also give correct feedback, and the user can always see effective display content on the activated user interface.

It should be noted that in the optional embodiment based on FIG. 7, the above-mentioned first direction and the second direction may be interchanged.

Figure 12:
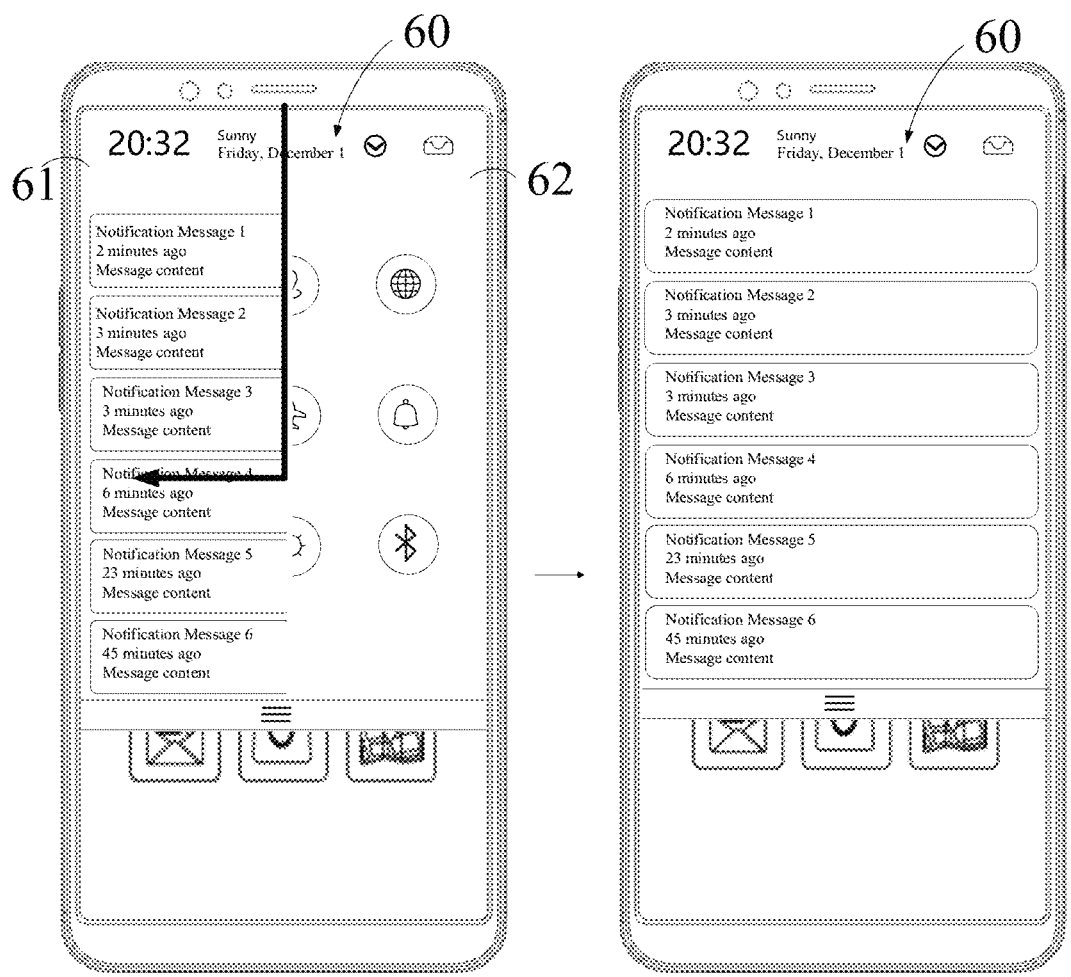
FIG. 12 is a schematic interface diagram of the user interface display method provided in the embodiment of FIG. 7 in a schematic implementation.
Figure 13:
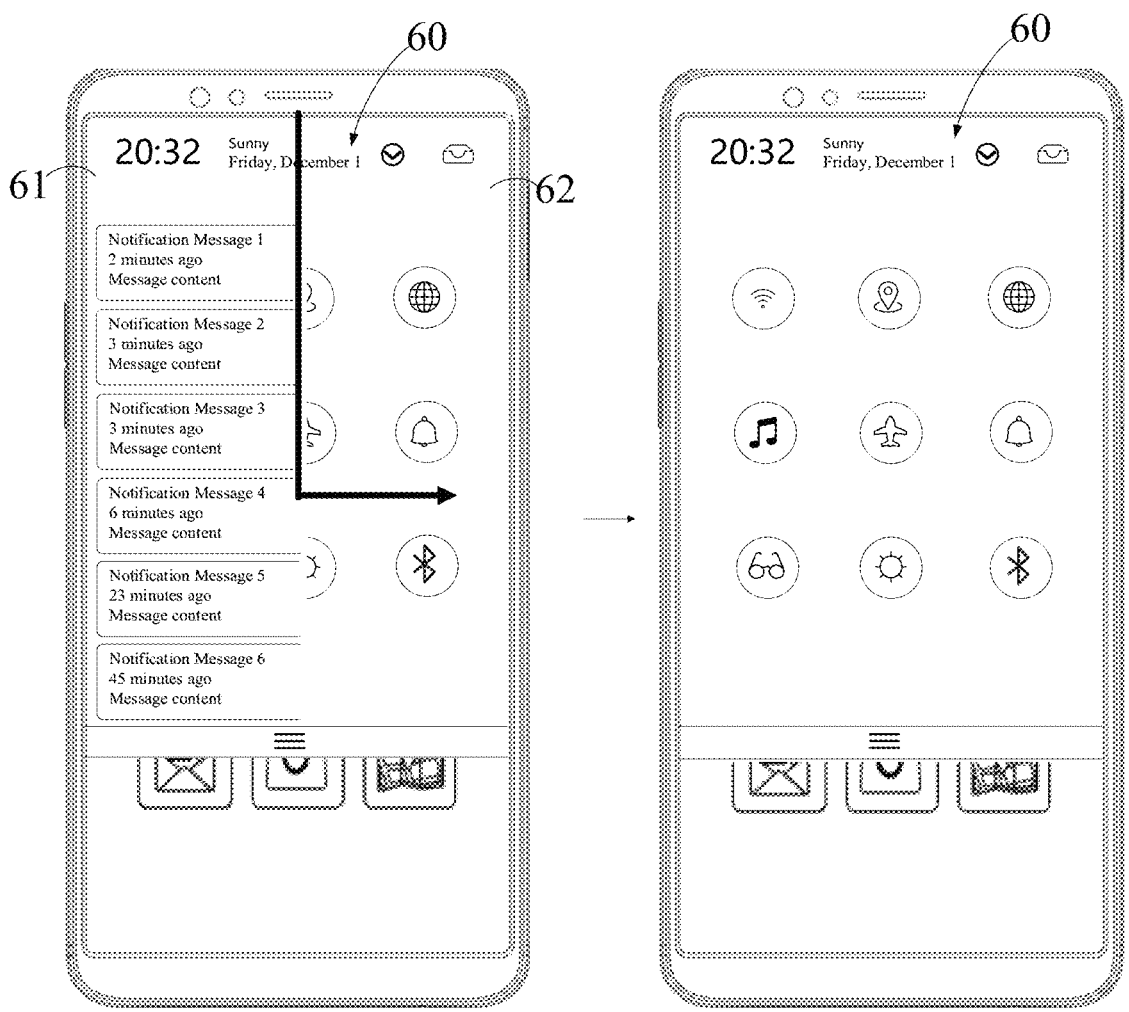
FIG. 13 is a schematic interface diagram of the user interface display method provided in the embodiment of FIG. 7 in a schematic implementation.

Taking the second direction as a left direction as an example, if the sliding direction of the sliding signal changes from the down direction to the left direction, the terminal may replace the right half content of the control center interface located in the second display region 62 with the right half content of the notification center interface, as shown in FIG. 12; taking the first edge as a right edge as an example, if the sliding direction of the sliding signal faces toward the first edge, the terminal may replace the left half content of the notification center interface located in the first display region 61 with the left half content of the control center interface, as shown in FIG. 13.

It should be noted that in the optional embodiment based on FIG. 7, the above preset direction may be replaced with an up direction. That is, the initial sliding direction of the sliding signal is the up direction, and the terminal displays an activated user interface according to the sliding direction of the sliding signal in the up direction; if the sliding direction of the sliding signal changes from the up direction to the left direction, the first sub-content in the first display region is replaced with the third sub-content of the second display content; if the sliding direction of the sliding signal changes from the up direction to the right direction, the fourth sub-content in the second display region is replaced with the second sub-content of the first display content; or, if the sliding direction of the sliding signal changes from the up direction to the right direction, the first sub-content in the first display region is replaced with the third sub-content of the second display content; if the sliding direction of the sliding signal changes from the up direction to the left direction, the fourth sub-content in the second display region is replaced with the second sub-content of the first display content.

The foregoing embodiments in FIG. 7 to FIG. 13 are described by taking the first display region and the second display region as divided by left and right. In different embodiments, the first display region and the second display region may also be obtained by dividing up and down. Please refer to the following examples.

Figure 14:
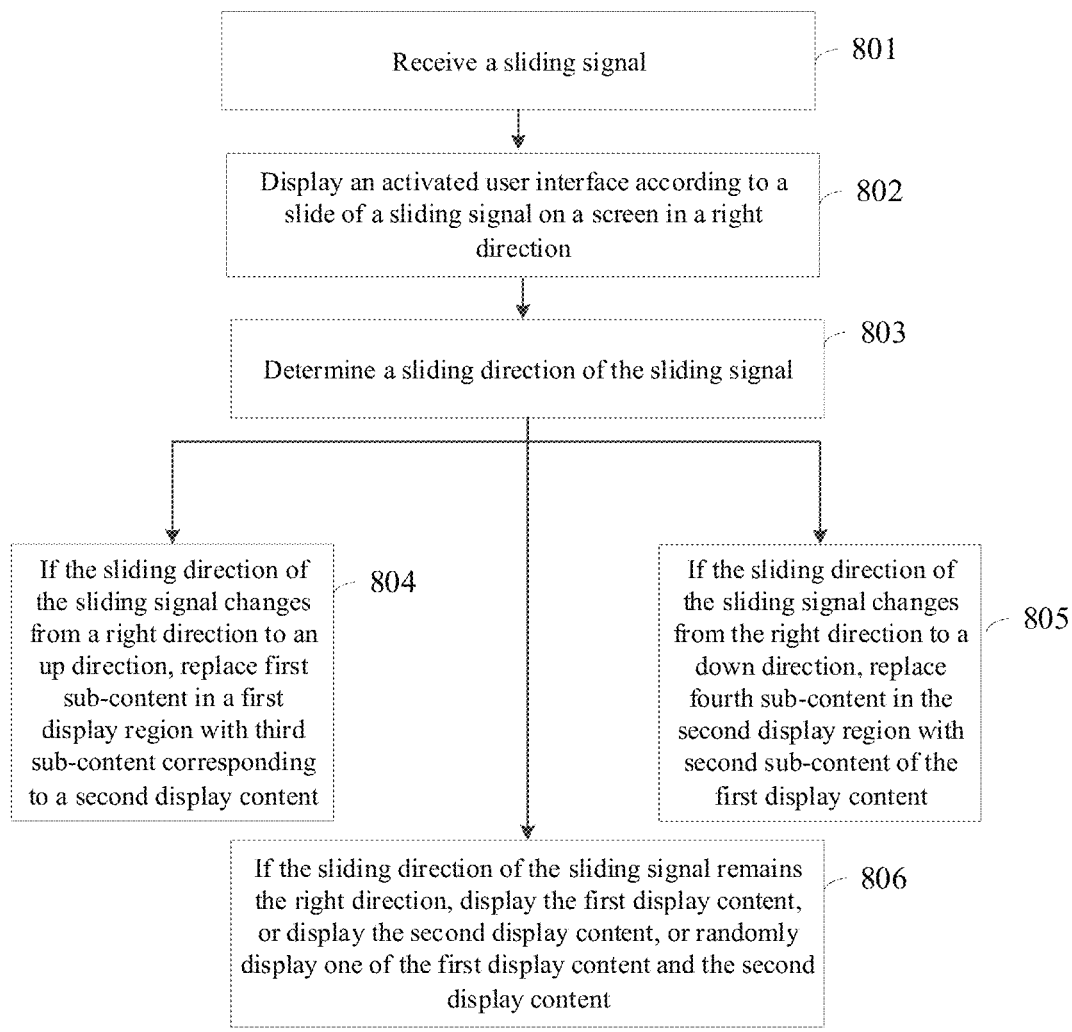
FIG. 14 shows a flowchart of a user interface display method provided by an exemplary embodiment of the present application.

FIG. 14 shows a flowchart of a user interface display method according to another exemplary embodiment of the present application. The method includes:

Step 801, receiving a sliding signal;

Step 802, displaying an activated user interface according to a slide of a sliding signal on a screen in a right direction;

an initial sliding direction of the sliding signal is a preset direction. In this embodiment, the preset direction is used for illustration.

Optionally, a terminal follows a sliding process of the sliding signal in the right direction, and moves the activated user interface from a left edge of the screen into the screen for display.

Optionally, if the sliding signal meets a preset condition, the terminal displays the activated user interface on the screen according to the slide of the sliding signal in the preset direction. The preset conditions include: a sliding starting point of the sliding signal is located at a preset edge of the screen; or, the sliding starting point of the sliding signal is located at the preset edge of the screen, and a sliding distance of the sliding signal exceeds a first threshold; or, the sliding starting point of the sliding signal is located in a predetermined region in middle of the preset edge; or, the sliding starting point of the sliding signal is located in the predetermined region in the middle of the preset edge, and the sliding distance of the sliding signal exceeds the first threshold. In this embodiment, the preset edge may be a left edge of the screen.

The activated user interface includes a first display region and a second display region. The first display region is all or most of region on upper side of the activated user interface, and the second display region is all or most of region on lower side of the activated user interface.

The first display region displays first sub-content of first display content, and the second display region displays fourth sub-content of second display content.

Figure 15:
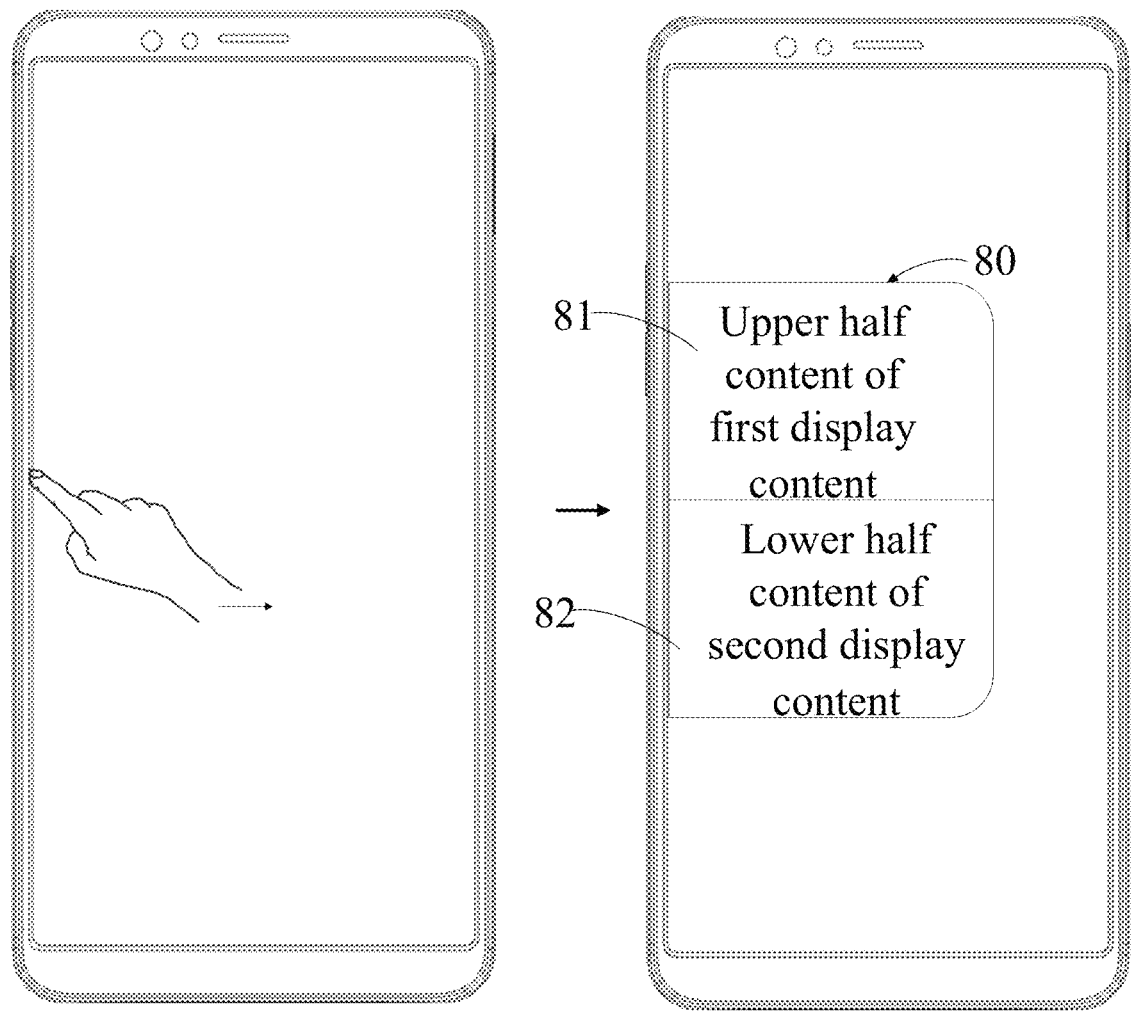
FIG. 15 is a schematic interface diagram of the user interface display method provided in the embodiment of FIG. 14 in a schematic implementation.

As shown in FIG. 15, an activated user interface 90 includes a first display region 91 and a second display region 92. The first display region 91 displays upper half content of the first display content, and the second display region 62 displays lower half content of the second display.

Optionally, the activated user interface 60 is displayed from right edge of the screen and moved into the screen. A speed at which the activated user interface 60 moves right into the screen is positively related to a sliding speed of the sliding signal. The activated user interface 60 may occupy the entire display region of the screen, or may occupy part of the display region of the screen.

Widths of the first display region 61 and the second display region 62 are same, and heights of the first display region 61 and the second display region 62 are same or different.

Optionally, part between the first display region 61 and the second display region 62 may be displayed with a dividing line, a border, or a blurred transition region, which is not limited in the embodiment of the present application.

Step 803, determining a sliding direction of the sliding signal;

a user can continue to slide on the screen, and the sliding direction of the sliding signal can be changed from a down direction to another direction, such as a left direction or a right direction, and the terminal determines the sliding direction of the sliding signal in real time.

The terminal receives an ACTION_MOVE event reported by a touch screen at predetermined time intervals, and extracts touch coordinates from the ACTION_MOVE event. Optionally, the terminal calculates the sliding direction of the sliding signal according to the touch coordinates collected adjacent two times (or multiple times in a row). For example, the terminal points an i-th touch coordinate to a direction of an i+1th touch coordinate and determines the sliding direction of the sliding signal; for example, the terminal draws a sliding track of the sliding signal based on the touch coordinates collected multiple times in succession, and determines the sliding direction of the sliding signal according to a tangent of latest touch coordinate on the sliding track. The embodiment of the present application does not limit the specific manner in which the terminal determines the sliding direction of the sliding signal.

Figure 16:
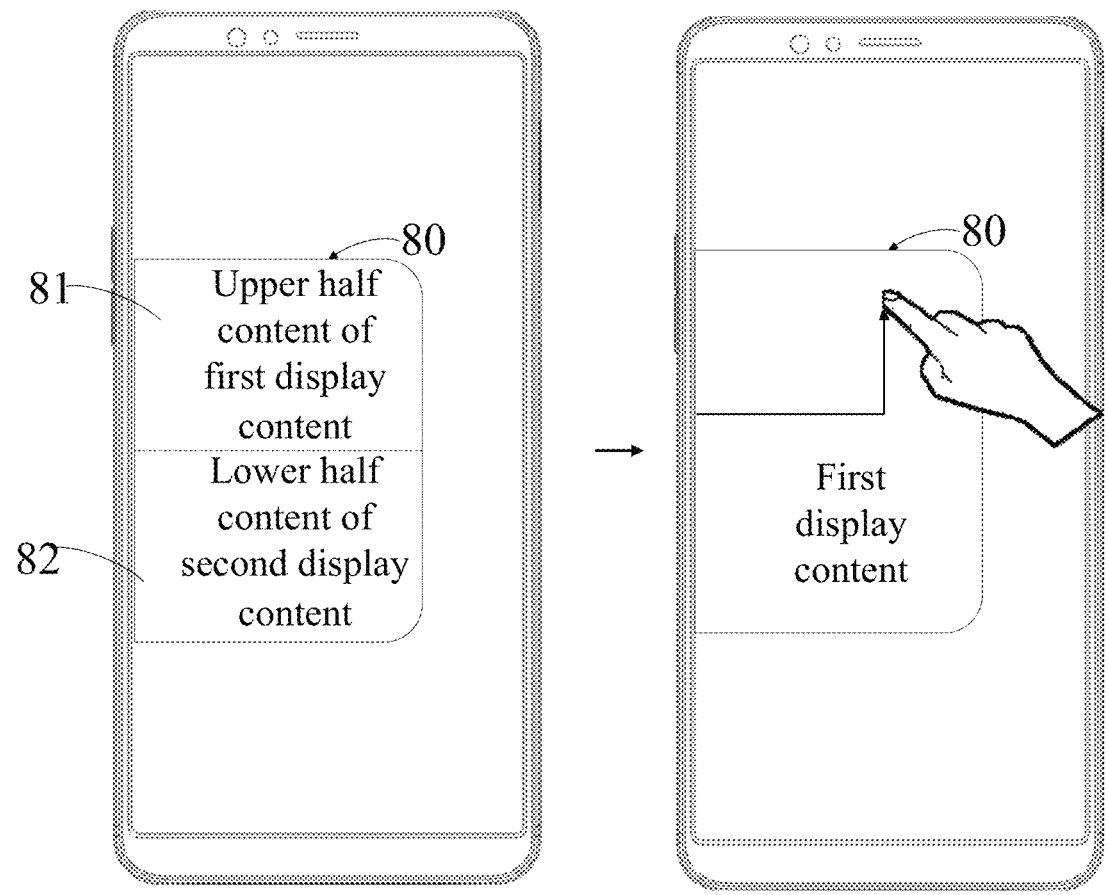
FIG. 16 is a schematic interface diagram of the user interface display method provided in the embodiment of FIG. 14 in a schematic implementation.

Step 804, if the sliding direction of the sliding signal changes from a right direction to an up direction, replacing first sub-content in a first display region with third sub-content corresponding to a second display content;

Assume that a horizontal right direction is a 0° direction. If the sliding direction changes from the right direction to the up direction, the right direction means that the sliding direction belongs to [180°−α, 180°+α], and the up direction means that the sliding direction belongs to [270°−α, 270°+α], the terminal replaces the first sub-content in the first display region 81 with the third sub-content corresponding to the second display content, as shown in FIG. 16. The α is a preset tolerance threshold.

Optionally, the above replacement process is a direct replacement in a short time, or the above replacement process is a slow replacement accompanied by animation. The animation corresponding to the above replacement process may be: moving the dividing line between the first display region 81 and the second display region 82 to an upper side at a first speed, the first sub-content located on the upper side of the dividing line gradually disappearing, the second display content located on a lower side of the dividing line gradually increasing, until when the dividing line moves to an upper edge side of the screen, the second display content is displayed on the entire activated user interface 80. That is, the terminal gradually cancels display of the first sub-content in the first display region and gradually displays the third sub-content in the first display region according to the slide of the terminal in the first direction.

Step 805, if the sliding direction of the sliding signal changes from the right direction to a down direction, replacing fourth sub-content in the second display region with second sub-content of the first display content.

Figure 17:
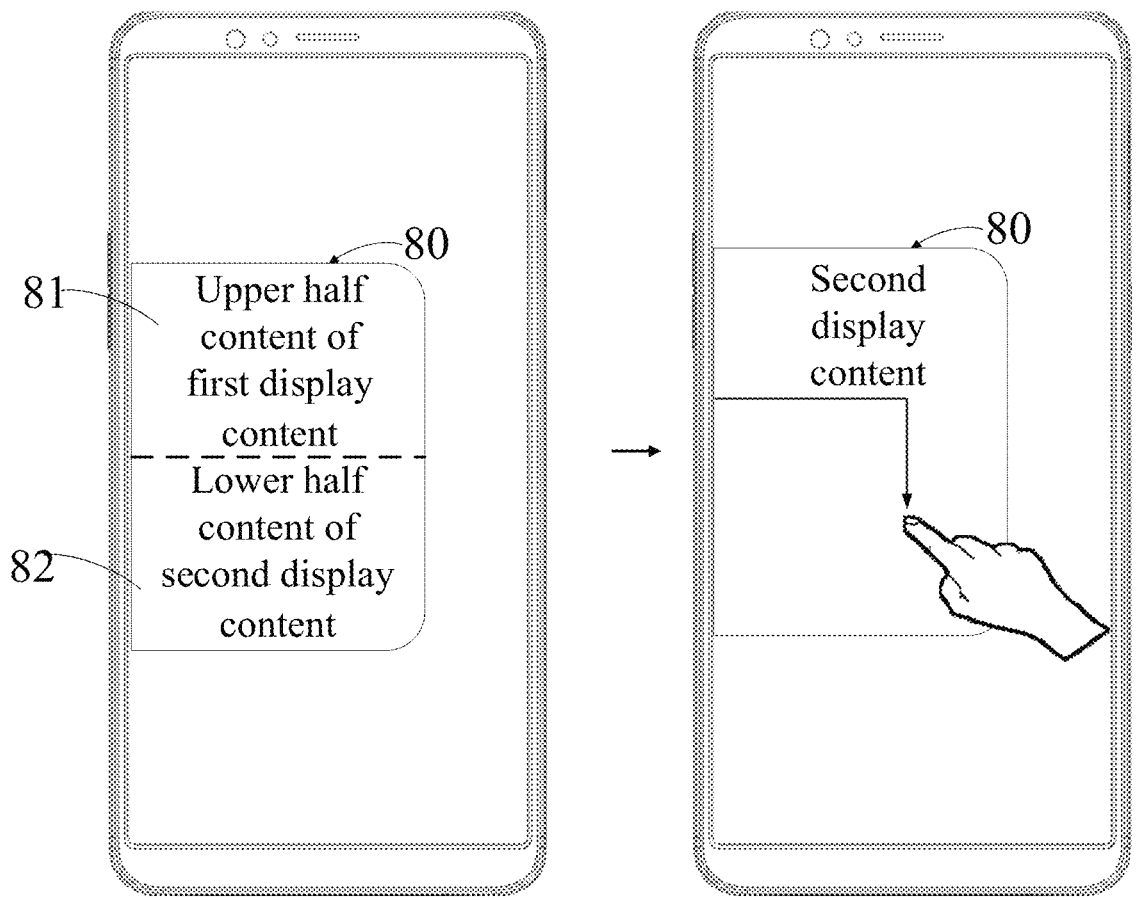
FIG. 17 is a schematic interface diagram of the user interface display method provided in the embodiment of FIG. 14 in a schematic implementation.

Assume that a horizontal right direction is the 0° direction, if the sliding direction changes from the right direction to the down direction, the right direction means that the sliding direction belongs to [0°−α, 0°+α], and the down direction means the sliding direction belongs to [90°−α, 90°+α], the terminal replaces the fourth sub-content in the second display region 82 with the second sub-content of the first display content, as shown in FIG. 17.

Optionally, the above replacement process is a direct replacement in a short time, or the above replacement process is a slow replacement accompanied by animation. The animation corresponding to the above replacement process may be: moving the dividing line between the first display region 81 and the second displaying region 82 to a lower side at a second speed, and the display content of the control center interface on the lower side of the dividing line gradually disappearing, the display content of the notification center interface located on an upper side of the dividing line gradually increasing, until the dividing line moves to a second edge side of the screen, the first display content is displayed on the entire activated user interface 80. That is, the terminal gradually cancels display of the fourth sub-content in the second display region and gradually displays the second sub-content in the second display region according to the slide of the terminal in the second direction.

Step 806, if the sliding direction of the sliding signal remains the right direction, displaying the first display content, or displaying the second display content, or randomly displaying one of the first display content and the second display content.

Since the user may slide right without changing the sliding direction, the terminal may display the notification center interface, or the control center interface, or randomly display one of the notification center interface and the control center interface.

In a possible embodiment, if the sliding direction of the sliding signal is an opposite direction of the preset direction (may be the left direction in this embodiment), the terminal cancels display of the activated user interface. That is, the terminal moves the activated user interface up and out of the screen in the preset edge of the screen, and restores the screen of the terminal to an original display state. The original display state is a display state of the terminal before displaying the activated user interface.

In summary, the method provided in this embodiment provides a preview of a notification center interface or a control center interface in two display regions by providing a first display region and a second display region side by side on an activated user interface. A sliding direction of a signal dynamically changes display content of one of the display regions, so that both the first display region and the second display region display certain display content, which solves the problems of limitation of display region of a pull-down user interface, and fewer control items and notification messages in related technologies, thereby achieving the effects, of which according to the sliding direction of the sliding signal, all of the first display content or the second display content can be displayed on the entire activated user interface, and more display content desired by the user can be displayed in a limited display region.

The method provided in this embodiment further displays a notification center interface or displays a control center interface or randomly displays one of the notification center interface and the control center interface if the sliding signal continues to slide right, so that even if a user does not change a sliding direction of the sliding signal, the terminal can also give correct feedback, and the user can always see effective display content on the activated user interface.

It should be noted that in the optional embodiment based on FIG. 14, the above-mentioned first direction and the second direction may be interchanged. That is, the first direction is a down direction, and the second direction is an up direction.

It should be noted that in the optional embodiment based on FIG. 14, the above preset direction may be replaced with a left direction. That is, the initial sliding direction of the sliding signal is the up direction, and the terminal displays an activated user interface according to the sliding direction of the sliding signal in the left direction; if the sliding direction of the sliding signal changes from the left direction to the up direction, the first sub-content in the first display region is replaced with the third sub-content of the second display content; if the sliding direction of the sliding signal changes from the left direction to the down direction, the fourth sub-content in the second display region is replaced with the second sub-content of the first display content; or, if the sliding direction of the sliding signal changes from the left direction to the down direction, the first sub-content in the first display region is replaced with the third sub-content of the second display content; if the sliding direction of the sliding signal changes from the left direction to the up direction, the fourth sub-content in the second display region is replaced with the second sub-content of the first display content.

The above embodiments can also be implemented in free combination. This is easily understood by those skilled in the art based on the above records, and will not be described in detail herein.

The following are device embodiments of the embodiments of the present application, and the device embodiments correspond to the above method embodiments one by one. For details that are not described in detail in the device embodiment, reference may be made to the description in the foregoing method embodiment.

Figure 18:
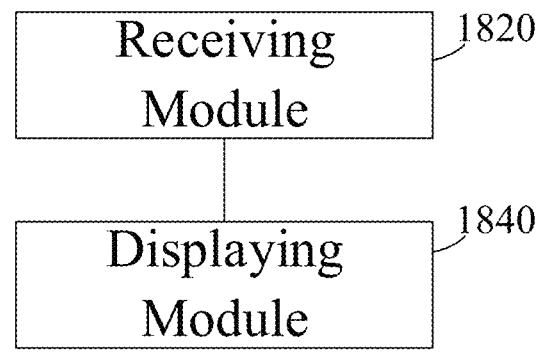
FIG. 18 is a flowchart of a user interface display device provided by an exemplary embodiment of the present application.

FIG. 18 is a block diagram of a user interface display device provided by an exemplary embodiment of the present application. The user interface display device can be implemented as all or part of a terminal through software, hardware, or a combination of both. The device includes:

a receiving module 1820, configured to receive a sliding signal;

a displaying module 1840, configured to display an activated user interface according to a slide of the sliding signal on a screen; the activated user interface includes a first display region and a second display region, the first display region displaying first sub-content of first display content, and the second display region displaying fourth sub-content of second display content;

the displaying module 1840 is configured to replace the first sub-content in the first display region with third sub-content of the second display content if a sliding direction of the sliding signal is a first direction, the second display content including the third sub-content and the fourth sub-content;

the displaying module 1840 is configured to replace the fourth sub-content in the second display region with the second sub-content in the first display region if the sliding direction of the sliding signal is a second direction, the first display content including the first sub-content and the second sub-content.

In an optional embodiment, an initial sliding direction of the sliding signal is a preset direction;

the displaying module 1840 is configured to replace the first sub-content in the first display region with the third sub-content of the second display content, if the sliding direction of the sliding signal changes from the preset direction to the first direction;

the displaying module 1840 is configured to replace the fourth sub-content in the second display region with the second sub-content of the first display content, if the sliding direction of the sliding signal changes from the preset direction to the second direction.

In an optional embodiment, the displaying module 1840 is configured to display the activated user interface on the screen according to the slide of the sliding signal in the preset direction.

In an optional embodiment, the displaying module 1840 is configured to gradually cancel display of the first sub-content in the first display region and gradually display the third sub-content in the first display region according to the slide of the sliding signal in the first direction; the displaying module 1840 is configured to gradually cancel display of the fourth sub-content in the second display region and gradually display the second sub-content in the second display region according to the slide of the sliding signal in the second direction.

In an optional embodiment, the first display region is a left half display region of the activated user interface, the first sub-content is a left half content of the first display content, and the third sub-content is a left half content of the second display content; the second display region is a right half display region of the activated user interface, the second sub-content is a right half content of the second display content, and the fourth sub-content is a right half content of the second display content.

In an optional embodiment, the displaying module 1840 is configured to replace the first sub-content in the first display region with the third sub-content of the second display content if the sliding direction of the sliding signal changes from a down direction to a left direction; or, the displaying module 1840 is configured to replace the first sub-content in the first display region with the third sub-content of the second display content if the sliding direction of the sliding signal changes from the down direction to a right direction; or, the displaying module 1840 is configured to replace the first sub-content in the first display region with the third sub-content of the second display content if the sliding direction of the sliding signal changes from an up direction to the left direction; or, the displaying module 1840 is configured to replace the first sub-content in the first display region with the third sub-content of the second display content if the sliding direction of the sliding signal changes from the up direction to the right direction.

In an optional embodiment, the displaying module 1840 is configured to replace the fourth sub-content in the second display region with the second sub-content of the first display content if the sliding direction of the sliding signal changes from the down direction to the right direction; or, the displaying module 1840 is configured to replace the fourth sub-content in the second display region with the second sub-content of the first display content if the sliding direction of the sliding signal changes from the down direction to the left direction; or, the displaying module 1840 is configured to replace the fourth sub-content in the second display region with the second sub-content of the first display content if the sliding direction of the sliding signal changes from the up direction to the right direction; or, the displaying module 1840 is configured to replace the fourth sub-content in the second display region with the second sub-content of the first display content if the sliding direction of the sliding signal changes from the up direction to the left direction.

In an optional embodiment, the first display region is an upper half display region of the activated user interface, the first sub-content is an upper half content of the first display content, and the third sub-content is an upper half content of the second display content; the second display region is a lower half display region of the activated user interface, the second sub-content is a lower half content of the second display content, and the fourth sub-content is a lower half content of the second display content.

In an optional embodiment, the displaying module 1840 is configured to replace the first sub-content in the first display region with the third sub-content of the second display content if the sliding direction of the sliding signal changes from the left direction to the up direction; or, the displaying module 1840 is configured to replace the first sub-content in the first display region with the third sub-content of the second display content if the sliding direction of the sliding signal changes from the left direction to the down direction; or, the displaying module 1840 is configured to replace the first sub-content in the first display region with the third sub-content of the second display content if the sliding direction of the sliding signal changes from the right direction to the up direction; or, the displaying module 1840 is configured to replace the first sub-content in the first display region with the third sub-content of the second display content if the sliding direction of the sliding signal changes from the right direction to the down direction.

In an optional embodiment, the displaying module 1840 is configured to replace the fourth sub-content in the second display region with the second sub-content of the first display content if the sliding direction of the sliding signal changes from the left direction to the down direction; or, the displaying module 1840 is configured to replace the fourth sub-content in the second display region with the second sub-content of the first display content if the sliding direction of the sliding signal changes from the left direction to the up direction; or, the displaying module 1840 is configured to replace the fourth sub-content in the second display region with the second sub-content of the first display content if the sliding direction of the sliding signal changes from the right direction to the down direction; or, the displaying module 1840 is configured to replace the fourth sub-content in the second display region with the second sub-content of the first display content if the sliding direction of the sliding signal changes from the right direction to the up direction.

In an optional embodiment, the displaying module 1840 is configured to, if the sliding signal meets a preset condition, display the activated user interface on the screen according to the slide of the sliding signal in the preset direction.

In an optional embodiment, the preset condition includes:
a sliding starting point of the sliding signal is at a preset edge of the screen;
or, the sliding starting point of the sliding signal is at the preset edge of the screen, and a sliding distance of the sliding signal exceeds a first threshold;
or, the sliding start point of the sliding signal is located in a predetermined region in middle of the preset edge;
or, the sliding starting point of the sliding signal is located in the predetermined region in the middle of the preset edge, and the sliding distance of the sliding signal exceeds the first threshold.

In an optional embodiment, the displaying module 1840 is configured to: if the sliding direction of the sliding signal remains the preset direction and a sliding distance of the sliding signal exceeds a second threshold, replace the first sub-content in the first display region with the third sub-content in the second display content, or replace the fourth sub-content in the second display region with the second sub-content of the first display content.

Figure 19:
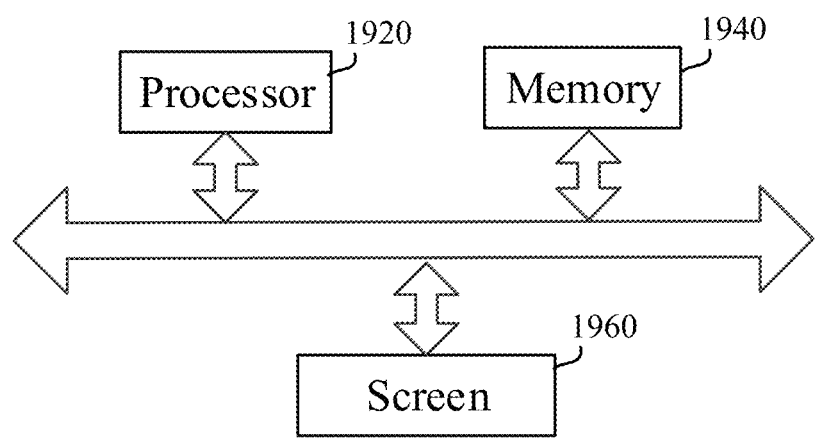
FIG. 19 shows a block diagram of a terminal provided by an exemplary embodiment of the present application.

FIG. 19 is a structural block diagram of a terminal provided by an exemplary embodiment of the present application. As shown in FIG. 19, the terminal includes a processor 1920, a memory 1940, and a screen 1960. The memory 1940 stores at least one program, and the at least one program is loaded and executed by the processor 1920 to implement the user interface display method described in the above embodiments. The screen 1960 may be a touch screen.

This application provides a computer-readable storage medium. The storage medium stores at least one instruction, and the at least one instruction is loaded and executed by the processor to implement the user interface display methods provided by the foregoing method embodiments.

The present application also provides a computer program product. When the computer program product runs on a computer, the computer is caused to execute the user interface display method provided by the foregoing method embodiments.

What is claimed is:

1. A method for displaying user interface, comprising:
receiving a sliding signal;
displaying an activated user interface according to a slide of the sliding signal on a screen for displaying first display content comprising first sub-content and second sub-content or second display content comprising third sub-content and fourth sub-content; the activated user interface comprises a first display region and a second display region, wherein the first sub-content is displayed in the first display region and the fourth sub-content is displayed in the second display;
if a sliding direction of the sliding signal is a first direction, replacing the first sub-content in the first region with the third sub-content to display the second display content comprising the third sub-content and the fourth sub-content in the activated user interface; and
if the sliding direction of the sliding signal is a second direction, replacing the fourth sub-content in the second display region with the second sub-content to display the first display content comprising first sub-content and second sub-content in the activated user interface.

2. The method according to claim 1, wherein an initial sliding direction of the sliding signal is a preset direction;
wherein if the sliding direction of the sliding signal is the first direction, replacing the first sub-content in the first region with the third sub-content to display the second display content comprising the third sub-content and the fourth sub-content in the activated user interface comprises:
if the sliding direction of the sliding signal is changed from the preset direction to the first direction, replacing the first sub-content in the first display region with the third sub-content of the second display content; and
wherein if the sliding direction of the sliding signal is the second direction, replacing the fourth sub-content in the second display region the second sub-content to display the first display content comprising first sub-content and second sub-content in the activated user interface comprises:
if the sliding direction of the sliding signal is changed from the preset direction to the second direction, replacing the fourth sub-content in the second display region with the second sub-content of the first display content.

3. The method according to claim 2, wherein the displaying the activated user interface according to the slide of the sliding signal on the screen comprises:
displaying the activated user interface on the screen according to the slide of the sliding signal in the preset direction.

4. The method according to claim 3, wherein displaying the activated user interface according to the slide of the sliding signal on the screen comprises:
if the sliding signal meets a preset condition, displaying the activated user interface on the screen according to the slide of the sliding signal in the preset direction.

5. The method according to claim 4, wherein, the preset condition comprises one of the following:
- a sliding starting point of the sliding signal is located at a preset edge of the screen;
- a sliding starting point of the sliding signal is located at a preset edge of the screen, and a sliding distance of the sliding signal exceeds a first threshold;
- a sliding starting point of the sliding signal is located in a predetermined region in middle of a preset edge;
- a sliding starting point of the sliding signal is located in a predetermined region in middle of a preset edge, and a sliding distance of the sliding signal exceeds a first threshold.

6. The method according to claim 2, wherein:
- the first display region comprises a left half display region of the activated user interface, the first sub-content comprises a left half content of the first display content, and the third sub-content comprises a left half content of the second display content; and
- the second display region comprises a right half display region of the activated user interface, the second sub-content comprises a right half content of the second display content, and the fourth sub-content comprises a right half content of the second display content.

7. The method according to claim 6, wherein if the sliding direction of the sliding signal is changed from the preset direction to the first direction, replacing the first sub-content in the first display region with the third sub-content of the second display content comprises one of the following:
- if the sliding direction of the sliding signal changes from a down direction to a left direction, replacing the first sub-content in the first display region with the third sub-content of the second display content;
- if the sliding direction of the sliding signal changes from a down direction to a right direction, replacing the first sub-content in the first display region with the third sub-content of the second display content;
- if the sliding direction of the sliding signal changes from an up direction to a left direction, replacing the first sub-content in the first display region with the third sub-content of the second display content;
- if the sliding direction of the sliding signal changes from an up direction to a right direction, replacing the first sub-content in the first display region with the third sub-content of the second display content.

8. The method according to claim 6, wherein if the sliding direction of the sliding signal is changed from the preset direction to the second direction, replacing the fourth sub-content in the second display region with the second sub-content of the first display content comprises one of the following:
- if the sliding direction of the sliding signal changes from a down direction to a right direction, replacing the fourth sub-content in the second display region with the second sub-content of the first display content;
- if the sliding direction of the sliding signal changes from a down direction to a left direction, replacing the fourth sub-content in the second display region with the second sub-content of the first display content;
- if the sliding direction of the sliding signal changes from an up direction to a right direction, replacing the fourth sub-content in the second display region with the second sub-content of the first display content;
- if the sliding direction of the sliding signal changes from an up direction to a left direction, replacing the fourth sub-content in the second display region with the second sub-content of the first display content.

9. The method according to claim 2, wherein:
- the first display region comprises an upper half display region of the activated user interface, the first sub-content comprises an upper half content of the first display content, and the third sub-content comprises an upper half content of the second display content; and
- the second display region comprises a lower half display region of the activated user interface, the second sub-content comprises a lower half content of the second display content, and the fourth sub-content comprises a lower half content of the second display content.

10. The method according to claim 9, wherein if the sliding direction of the sliding signal is changed from the preset direction to the first direction, replacing the first sub-content in the first display region with the third sub-content of the second display content comprises one of the following:
- if the sliding direction of the sliding signal changes from a left direction to an up direction, replacing the first sub-content in the first display region with the third sub-content of the second display content;
- if the sliding direction of the sliding signal changes from a left direction to a down direction, replacing the first sub-content in the first display region with the third sub-content of the second display content;
- if the sliding direction of the sliding signal changes from a right direction to an up direction, replacing the first sub-content in the first display region with the third sub-content of the second display content;
- if the sliding direction of the sliding signal changes from a right direction to a down direction, replacing the first sub-content in the first display region with the third sub-content of the second display content.

11. The method according to claim 9, wherein if the sliding direction of the sliding signal is changed from the preset direction to the second direction, replacing the fourth sub-content in the second display region with the second sub-content of the first display content comprises one of the following:
- if the sliding direction of the sliding signal changes from a left direction to a down direction, replacing the fourth sub-content in the second display region with the second sub-content of the first display content;
- if the sliding direction of the sliding signal changes from a left direction to an up direction, replacing the fourth sub-content in the second display region with the second sub-content of the first display content;
- if the sliding direction of the sliding signal changes from a right direction to a down direction, replacing the fourth sub-content in the second display region with the second sub-content of the first display content;
- if the sliding direction of the sliding signal changes from a right direction to an up direction, replacing the fourth sub-content in the second display region with the second sub-content of the first display content.

12. The method according to claim 2, wherein the method further comprises:
- if the sliding direction of the sliding signal remains the preset direction and a sliding distance of the sliding signal exceeds a second threshold, replacing the first sub-content in the first display region with the third sub-content of the second display content, or replacing the fourth sub-content in the second display region with the second sub-content of the first display content.

13. The method according to claim 1, wherein the replacing the first sub-content in the first region with the third sub-content to display the second display content comprising the third sub-content and the fourth sub-content in the activated user interface comprises:
gradually cancelling display of the first sub-content in the first display region and gradually displaying the third sub-content in the first display region according to the slide of the sliding signal in the first direction; and
wherein the replacing the fourth sub-content in the second display region with the second sub-content to display the first display content comprising first sub-content and second sub-content in the activated user interface comprises:
gradually cancelling display of the fourth sub-content in the second display region and gradually displaying the second sub-content in the second display region according to the slide of the sliding signal in the second direction.

14. A non-transitory computer-readable storage medium, wherein the storage medium stores at least one program that when loaded and executed by a processor, implements the method for displaying user interface according to claim 1.

15. A terminal, comprising:
a processor and a memory, and the memory stores at least one program, and the at least one program is loaded and executed by the processor to perform:
receiving a sliding signal;
displaying an activated user interface according to a slide of the sliding signal on a screen for displaying first display content comprising first sub-content and second sub-content or second display content comprising third sub-content and fourth sub-content; the activated user interface comprises a first display region and a second display region, wherein the first sub-content is displayed in the first display region and the fourth sub-content is displayed in the second display region;
if a sliding direction of the sliding signal is a first direction, replacing the first sub-content in the first region with the third sub-content to display the second display content comprising the third sub-content and the fourth sub-content in the activated user interface; and
if the sliding direction of the sliding signal is a second direction, replacing the fourth sub-content in the second display region with the second sub-content to display the first display content comprising first sub-content and second sub-content in the activated user interface.

16. The terminal according to claim 15, wherein an initial sliding direction of the sliding signal is a preset direction;
wherein if the sliding direction of the sliding signal is the first direction, replacing the first sub-content in the first region with the third sub-content to display the second display content comprising the third sub-content and the fourth sub-content in the activated user interface comprises:
if the sliding direction of the sliding signal is changed from the preset direction to the first direction, replacing the first sub-content in the first display region with the third sub-content of the second display content; and
wherein if the sliding direction of the sliding signal is the second direction, replacing the fourth sub-content in the second display region with the second sub-content to display the first display content comprising first sub-content and second sub-content in the activated user interface comprises:
if the sliding direction of the sliding signal is changed from the preset direction to the second direction, replacing the fourth sub-content in the second display region with the second sub-content of the first display content.

17. The terminal according to claim 16, wherein displaying the activated user interface according to the slide of the sliding signal on the screen comprises:
displaying the activated user interface on the screen according to the slide of the sliding signal in the preset direction.

18. The terminal according to claim 16, wherein:
the first display region comprises a left half display region of the activated user interface, the first sub-content comprises a left half content of the first display content, and the third sub-content comprises a left half content of the second display content; and
the second display region comprises a right half display region of the activated user interface, the second sub-content comprises a right half content of the second display content, and the fourth sub-content comprises a right half content of the second display content.

19. The terminal according to claim 18, wherein if the sliding direction of the sliding signal is changed from the preset direction to the first direction, replacing the first sub-content in the first display region with the third sub-content of the second display content comprises one of the following:
if the sliding direction of the sliding signal changes from a down direction to a left direction, replacing the first sub-content in the first display region with the third sub-content of the second display content;
if the sliding direction of the sliding signal changes from a down direction to a right direction, replacing the first sub-content in the first display region with the third sub-content of the second display content;
if the sliding direction of the sliding signal changes from an up direction to a left direction, replacing the first sub-content in the first display region with the third sub-content of the second display content;
if the sliding direction of the sliding signal changes from an up direction to a right direction, replacing the first sub-content in the first display region with the third sub-content of the second display content.

20. The terminal according to claim 15, wherein replacing the first sub-content in the first region with the third sub-content to display the second display content comprising the third sub-content and the fourth sub-content in the activated user interface comprises:
gradually cancelling display of the first sub-content in the first display region and gradually displaying the third sub-content in the first display region according to the slide of the sliding signal in the first direction; and
wherein the replacing the fourth sub-content in the second display region with the second sub-content to display the first display content comprising first sub-content and second sub-content in the activated user interface comprises:
gradually cancelling display of the fourth sub-content in the second display region and gradually displaying the second sub-content in the second display region according to the slide of the sliding signal in the second direction.

* * * * *